(12) United States Patent
Gao

(10) Patent No.: US 10,951,350 B2
(45) Date of Patent: Mar. 16, 2021

(54) PHYSICAL UPLINK CONTROL CHANNEL TRANSMISSION METHOD AND RECEPTION METHOD, APPARATUS, USER EQUIPMENT AND BASE STATION

(71) Applicant: CHINA ACADEMY OF TELECOMMUNICATIONS TECHNOLOGY, Beijing (CN)

(72) Inventor: Xuejuan Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/622,880

(22) PCT Filed: May 30, 2018

(86) PCT No.: PCT/CN2018/089019
§ 371 (c)(1),
(2) Date: Dec. 13, 2019

(87) PCT Pub. No.: WO2018/228194
PCT Pub. Date: Dec. 20, 2018

(65) Prior Publication Data
US 2020/0213031 A1    Jul. 2, 2020

(30) Foreign Application Priority Data

Jun. 16, 2017  (CN) .......................... 201710457951.5
Jun. 30, 2017  (CN) .......................... 201710527934.4

(51) Int. Cl.
*H04L 1/00*    (2006.01)
*H04W 72/04*  (2009.01)
*H04W 72/12*  (2009.01)

(52) U.S. Cl.
CPC .......... *H04L 1/0006* (2013.01); *H04L 1/0013* (2013.01); *H04W 72/0413* (2013.01); *H04W 72/0446* (2013.01); *H04W 72/1257* (2013.01)

(58) Field of Classification Search
CPC ............... H04L 1/0006; H04L 1/0013; H04W 72/0413; H04W 72/1257; H04W 72/0046
See application file for complete search history.

(56) References Cited

U.S. PATENT DOCUMENTS

2011/0243066 A1* 10/2011 Nayeb Nazar .......... H04L 1/007
                                                        370/328
2014/0301324 A1* 10/2014 Cheng .................. H04L 5/0055
                                                        370/329
(Continued)

FOREIGN PATENT DOCUMENTS

CN     102098146 A    6/2011
CN     104812086 A    7/2015

OTHER PUBLICATIONS

International Search Report issued for International Application No. PCT/CN2018/089019 dated Jul. 25, 2018.
(Continued)

*Primary Examiner* — Shukri Taha
(74) *Attorney, Agent, or Firm* — Flener IP & Business Law; Zareefa B. Flener

(57) ABSTRACT

A method of transmitting a physical uplink control channel PUCCH, a method of receiving a PUCCH, an apparatus, a user equipment and a base station are provided. The method of transmitting a PUCCH includes: determining a plurality of target slots to transmit to-be-fed-back uplink control information UCI, where the to-be-fed-back UCI is transmitted in the target slots by using the PUCCH; determining a transmission duration or format of the PUCCH carrying the to-be-fed-back UCI in each of the plurality of target slots respectively; transmitting, in accordance with the deter-
(Continued)

mined transmission duration or format of the PUCCH, the PUCCH carrying the to-be-fed-back UCI in each of the plurality of target slots.

20 Claims, 4 Drawing Sheets

(56) References Cited

U.S. PATENT DOCUMENTS

2016/0323923 A1   11/2016  Wei
2018/0212718 A1*  7/2018  Takeda .................. H04W 24/10
2019/0261355 A1*  8/2019  Lin ..................... H04W 72/0413
2020/0008103 A1*  1/2020  Lin ....................... H04W 76/27

OTHER PUBLICATIONS

Written Opinion issued for International Application No. PCT/CN2018/089019 dated Jul. 25, 2018.
International Preliminary Report on Patentability issued for International Application No. PCT/CN2018/089019 dated Dec. 17, 2019.
MediaTek Inc., 3GPP TSG RAN WG1 Meeting #86bis, R1-1609555, "Discussion on slot structure and channel format," Oct. 10-14, 2016, pp. 1-6.
Guangdong OPPO Mobile Telecom, 3GPP TSG RAN WG1 Meeting #87, R1-1611705, "Waveform selection for uplink control signal," Nov. 14-18, 2016, pp. 1-5.
"Long duration PUCCH structure", R1-1706953, 3GPP TSG RAN WG1 Meeting #89, Hangzhou, China, May 15-19, 2017.
"Time and frequency domain resource allocation for long PUCCH", R1-1707396, 3GPP TSG RAN WG1 Meeting #89, Hangzhou, China, May 15-19, 2017.
"Consideration on HARQ-ACK feedback method for NR", R1-1707656, 3GPP TSG RAN WG1 Meeting #89, Hangzhou, China, May 15-19, 2017.
"Long PUCCH Transmission Aspects", R1-1708006, 3GPP TSG RAN WG1 Meeting #89, Hangzhou, China, May 15-19, 2017.
"Multiplexing of multiple HARQ-ACK feedback", R1-1708151, 3GPP TSG RAN WG1 Meeting #89, Hangzhou, China, May 15-19, 2017.
Extended European Search Report from EP app. No. 18817534.3, dated Apr. 24, 2020.

* cited by examiner

PHYSICAL UPLINK CONTROL CHANNEL TRANSMISSION METHOD AND RECEPTION METHOD, APPARATUS, USER EQUIPMENT AND BASE STATION

CROSS-REFERENCE TO RELATED APPLICATIONS

The present application is the U.S. national phase PCT Application No. PCT/CN2018/089019 filed on May 30, 2018, which claims a priority to the Chinese patent application No. 2017/10457951.5 filed in China on Jun. 16, 2017 and a priority to the Chinese patent application No. 2017/10527934.4 filed in China on Jun. 30, 2017, the disclosures of which are incorporated herein by reference in their entireties.

TECHNICAL FIELD

The present disclosure relates to the field of communication technology, in particular to a method of transmitting a physical uplink control channel (PUCCH), a method of receiving a PUCCH, an apparatus of transmitting PUCCH, an apparatus of receiving PUCCH, a user equipment (UE) and a base station.

BACKGROUND

In view of the evolving demands of mobile communication services, organizations such as International Telecommunication Union (ITU) and 3rd Generation Partnership Project (3GPP) are beginning to research new wireless communication system (e.g., 5 generation new RAT (5G NR)). New frame structures are defined for the new wireless communication system to support various numerologies (which includes parameters such as subcarrier spacing). For the various numerologies, a sub-frame duration is always defined to be 1 ms and one sub-frame includes a quantity A of slots. The quantity A may be different for different numerologies, so as to satisfy the requirement that the sub-frame duration is 1 ms. For the various numerologies, one slot may include 7 or 14 symbols (such as orthogonal frequency division multiplexing (OFDM) symbol or discrete Fourier transformation-spread-orthogonal frequency division multiplexing (DFT-S-OFDM) symbol). For example, when the subcarrier spacing is 30 kHz, assuming it is determined by agreement or configured that one slot includes 7 symbols, one sub-frame needs to include 4 slots to satisfy the requirement that the sub-frame duration is 1 ms; assuming it is determined by agreement or configured that one slot includes 14 symbols, one sub-frame needs to include 2 slots to satisfy the requirement that the sub-frame duration is 1 ms. A slot may be of various structures which respectively correspond to different resource division modes for uplink and downlink transmission in a slot. For example, all symbols in a slot may be assigned for downlink transmission, namely a DL only slot; or all symbols in a slot may be assigned for uplink transmission, namely a UL only slot; or part of symbols in a slot may be assigned for uplink transmission and part of symbols in the slot may be assigned for downlink transmission, namely a DL+UL slot. A slot structure may be informed to UE semi-statically by means of a radio resource control (RRC) signaling, or may be informed to UE dynamically by means of a multicast common signaling to achieve a dynamic change of slot structure.

Since a quantity of uplink symbols in a slot may vary, a long PUCCH and a short PUCCH are defined in the 5G NR system. The long PUCCH may include 4 to 14 symbols and the short PUCCH may include 1 or 2 symbols. In case that uplink control information (UCI) is transmitted in a long PUCCH, in order to enhance uplink coverage, the UCI may be transmitted in multiple slots repetitively. Since uplink regions of different slots may vary in size, there is thus far no definite solution on how to transmit target information in multiple slots by using a long PUCCH.

SUMMARY

An objective of the present disclosure is to provide a method of transmitting a PUCCH, a method of receiving a PUCCH, an apparatus, a user equipment (UE) and a base station to allow for PUCCH transmission in multiple slots.

To achieve the foregoing objective, embodiments of the present disclosure provide a method of transmitting a PUCCH, including: determining a plurality of target slots to transmit to-be-fed-back uplink control information (UCI), where the to-be-fed-back UCI is transmitted in the target slots by using the PUCCH; determining a transmission duration or format of the PUCCH carrying the to-be-fed-back UCI in each of the plurality of target slots respectively; and transmitting, in accordance with the determined transmission duration or format of the PUCCH, the PUCCH carrying the to-be-fed-back UCI in each of the plurality of target slots.

The determining the plurality of target slots to transmit the to-be-fed-back UCI includes: determining the plurality of target slots to transmit the to-be-fed-back UCI in accordance with predefined information of the plurality of target slots; or determining the plurality of target slots to transmit the to-be-fed-back UCI in accordance with information of the plurality of target slots which is configured by a higher layer signaling; or receiving information of the plurality of target slots which is transmitted by a preset physical downlink control channel (PDCCH) and determining the plurality of target slots to transmit the to-be-fed-back UCI, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The determining the transmission duration or format of the PUCCH carrying the to-be-fed-back UCI in each of the plurality of target slots respectively includes: receiving the transmission duration or format, which is transmitted by a preset PDCCH, of the PUCCH carrying the to-be-fed-back UCI in each of the plurality of target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; or determining the transmission duration or format of the PUCCH carrying the to-be-fed-back UCI in each of the plurality of target slots respectively in accordance with a size of an uplink region contained in each target slot or a size of an uplink region for a PUCCH transmission contained in each target slot; or receiving indication information transmitted by a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots; and determining the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

The transmitting, in accordance with the determined transmission duration or format of the PUCCH, the PUCCH carrying the to-be-fed-back UCI in each of the plurality of target slots includes: determining a transmission structure of the UCI and a reference signal (RS) in the PUCCH in each of the plurality of target slots respectively in accordance with the determined transmission duration or format of the PUCCH carrying the to-be-fed-back UCI in each of the plurality of target slots; and transmitting, in accordance with the transmission structure of the UCI and the RS in the PUCCH in each of the plurality of target slots, the PUCCH carrying the to-be-fed-back UCI in each of the plurality of target slots respectively.

The method further includes: receiving start position and/or end position, transmitted by a preset PDCCH, of the PUCCH in each of one or more target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; and/or, determining, in accordance with a predetermined rule, start position and/or end position of the PUCCH in each of one or more target slots.

The transmitting the PUCCH carrying the to-be-fed-back UCI in each of the plurality of target slots includes: if a size of the to-be-fed-back UCI is less than or equal to a first preset value, acquiring a modulation symbol by modulating the to-be-fed-back UCI, and transmitting a PUCCH carrying the modulation symbol repeatedly in each of the plurality of target slots; and if the size of the to-be-fed-back UCI is greater than the first preset value, acquiring a first coded bit sequence by performing a channel coding and rate matching on the to-be-fed-back UCI in accordance with a quantity of symbols carrying the UCI in the PUCCH, and transmitting a PUCCH carrying the first coded bit sequence repeatedly in each of the plurality of target slots; or, if the size of the to-be-fed-back UCI is greater than the first preset value, acquiring a second coded bit sequence by performing a channel coding and rate matching on the to-be-fed-back UCI in accordance with a quantity of symbols carrying the UCI in the PUCCH and a quantity of the target slots, and transmitting, in each of the plurality of target slots, a PUCCH carrying a bit sub-sequence of the second coded bit sequence that corresponds to the target slot.

Embodiments of the present disclosure further provide a method of receiving a PUCCH, including: determining a plurality of target slots to transmit to-be-fed-back UCI, where the to-be-fed-back UCI is transmitted in the target slots by using the PUCCH; determining a transmission duration or format of the PUCCH carrying the to-be-fed-back UCI in each of the plurality of target slots respectively; and receiving, in accordance with the determined transmission duration or format of the PUCCH, the PUCCH carrying the to-be-fed-back UCI in each of the plurality of target slots.

The determining the plurality of target slots to transmit the to-be-fed-back UCI includes: determining the plurality of target slots to transmit the to-be-fed-back UCI in accordance with predefined information of the plurality of target slots.

After the determining the plurality of target slots to transmit the to-be-fed-back UCI, the method includes: transmitting information of the plurality of target slots to user equipment (UE) by means of a higher layer signaling or a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The determining the transmission duration or format of the PUCCH carrying the to-be-fed-back UCI in each of the plurality of target slots respectively includes: determining the transmission duration or format of the PUCCH carrying the to-be-fed-back UCI in each of the plurality of target slots respectively in accordance with a size of an uplink region in each of the plurality of target slots or a size of an uplink region for a PUCCH transmission in each of the plurality of target slots.

After the determining the transmission duration or format of the PUCCH carrying the to-be-fed-back UCI in each of the plurality of target slots respectively, the method further includes: transmitting the transmission duration or format of the PUCCH in each target slot to user equipment (UE) by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

After the determining the plurality of target slots to transmit the to-be-fed-back UCI, the method further includes: transmitting indication information to user equipment (UE) by means of a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots, such that the UE determines the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

The receiving, in accordance with the determined transmission duration or format of the PUCCH, the PUCCH carrying the to-be-fed-back UCI in each of the plurality of target slots includes: determining a transmission structure of the UCI and a reference signal (RS) in the PUCCH in each of the plurality of target slots respectively in accordance with the transmission duration or format of the PUCCH in each of the plurality of target slots; and transmitting, in accordance with the transmission structure of the UCI and the RS of the PUCCH in each of the plurality of target slots, the PUCCH carrying the to-be-fed-back UCI in each of the plurality of target slots respectively.

The method further includes: determining, in accordance with a predetermined rule, a start position and/or an end position of the PUCCH in each of the plurality of target slots respectively.

The method further includes: transmitting the determined start position and/or end position of the PUCCH in each of the plurality of target slots to user equipment (UE) by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The receiving the PUCCH carrying the to-be-fed-back UCI in each of the plurality of target slots includes: if a size of the to-be-fed-back UCI is less than or equal to a first preset value, receiving a PUCCH carrying a modulation symbol in each of the plurality of target slots, where the modulation symbol results from a modulation performed by user equipment (UE) on the to-be-fed-back UCI; and if the size of the to-be-fed-back UCI is greater than the first preset value, receiving a PUCCH carrying a first bit sequence in each of the plurality of target slots; or, if the size of the to-be-fed-back UCI is greater than the first preset value, receiving, in each of the plurality of target slots, a PUCCH carrying a bit sub-sequence of the second bit sequence that corresponds to the target slot, where the first bit sequence is a coded bit sequence resulting from a channel coding and rate matching performed by the UE on the to-be-fed-back UCI in accordance with a quantity of symbols carrying the UCI in the PUCCH, and the second bit sequence is a coded bit sequence resulting from a channel coding and rate matching performed by the UE on the to-be-fed-back UCI in accordance with a quantity of symbols carrying the UCI in the PUCCH and a quantity of the target slots.

After the receiving, in accordance with the determined transmission duration or format of the PUCCH, the PUCCH carrying the to-be-fed-back UCI in each of the plurality of target slots, the method further includes: acquiring the to-be-fed-back UCI from the PUCCH.

The acquiring the to-be-fed-back UCI from the PUCCH includes: if the size of the to-be-fed-back UCI is less than or equal to the first preset value, merging the modulation symbols received in the plurality of target slots and determining the to-be-fed-back UCI in accordance with a merged modulation symbol; and if the size of the to-be-fed-back UCI is greater than the first preset value, merging the first bit sequences received in the plurality of target slots and determining the to-be-fed-back UCI by decoding a merged first bit sequence, or merging modulation symbol sequences received in the plurality of target slots that correspond to the first bit sequence, deriving the first bit sequence from a merged modulation symbol sequence, and determining the to-be-fed-back UCI by decoding the first bit sequence; or acquiring the second bit sequence by cascading the bit sub-sequences of the second bit sequence received in the plurality of target slots, and determining the to-be-fed-back UCI by decoding the second bit sequence.

Embodiments of the present disclosure further provide an apparatus of transmitting a PUCCH, including: a first determination module, configured to determine a plurality of target slots to transmit to-be-fed-back uplink control information (UCI), where the to-be-fed-back UCI is transmitted in the target slots by using the PUCCH; a second determination module, configured to determine a transmission duration or format of the PUCCH carrying the to-be-fed-back UCI in each of the plurality of target slots respectively; and a transmission module, configured to transmit, in accordance with the determined transmission duration or format of the PUCCH, the PUCCH carrying the to-be-fed-back UCI in each of the plurality of target slots.

The first determination module includes: a first determination sub-module, configured to determine the plurality of target slots to transmit the to-be-fed-back UCI in accordance with predefined information of the plurality of target slots; and/or a second determination sub-module, configured to determine the plurality of target slots to transmit the to-be-fed-back UCI in accordance with information of the plurality of target slots which is configured by a higher layer signaling; and/or a third determination sub-module, configured to receive information of the plurality of target slots which is transmitted by a preset PDCCH and determine the plurality of target slots to transmit the to-be-fed-back UCI, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The second determination module includes: a fourth determination sub-module, configured to receive the transmission duration or format, which is transmitted by a preset PDCCH, of the PUCCH carrying the to-be-fed-back UCI in each of the plurality of target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; and/or a fifth determination sub-module, configured to determine the transmission duration or format of the PUCCH carrying the to-be-fed-back UCI in each of the plurality of target slots respectively in accordance with a size of an uplink region contained in each target slot or a size of an uplink region for a PUCCH transmission contained in each target slot; and/or a sixth determination sub-module, configured to receive indication information transmitted by a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots: and determine the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

The transmission module includes: a structure determination sub-module, configured to determine a transmission structure of the UCI and a reference signal (RS) in the PUCCH in each of the plurality of target slots respectively in accordance with the determined transmission duration or format of the PUCCH carrying the to-be-fed-back UCI in each of the plurality of target slots; and a first transmission sub-module, configured to transmit, in accordance with the transmission structure of the UCI and the RS of the PUCCH in each of the plurality of target slots, the PUCCH carrying the to-be-fed-back UCI in each of the plurality of target slots respectively.

The apparatus further includes: a first position determination module, configured to receive start position and/or end position, transmitted by a preset PDCCH, of the PUCCH in each of one or more target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; and/or a second position determination module, configured to determine, in accordance with a predetermined rule, start position and/or end position of the PUCCH in each of one or more target slots.

The transmission module includes: a second transmission sub-module, configured to, if a size of the to-be-fed-back UCI is less than or equal to a first preset value, acquire a modulation symbol by modulating the to-be-fed-back UCI, and transmit a PUCCH carrying the modulation symbol repeatedly in each of the plurality of target slots; and a third transmission sub-module, configured to, if the size of the to-be-fed-back UCI is greater than the first preset value, acquire a first coded bit sequence by performing a channel coding and rate matching on the to-be-fed-back UCI in accordance with a quantity of symbols carrying the UCI in the PUCCH, and transmit a PUCCH carrying the first coded bit sequence repeatedly in each of the plurality of target slots; or, if the size of the to-be-fed-back UCI is greater than the first preset value, acquire a second coded bit sequence by performing a channel coding and rate matching on the to-be-fed-back UCI in accordance with a quantity of symbols carrying the UCI in the PUCCH and a quantity of the target slots, and transmit, in each of the plurality of target slots, a PUCCH carrying a bit sub-sequence of the second coded bit sequence that corresponds to the target slot.

Embodiments of the present disclosure further provide a UE, including: a processor, a memory connected to the processor via a bus interface, and a transceiver connected to the processor via the bus interface, where the memory is configured to store program and data used by the processor in operation, the transceiver is configured to transmit a control command, and the processor is configured to call and execute the program and data stored in the memory to implement following steps: determining a plurality of target slots to transmit to-be-fed-back uplink control information (UCI), where the to-be-fed-back UCI is transmitted in the target slots by using a physical uplink control channel (PUCCH); determining a transmission duration or format of the PUCCH carrying the to-be-fed-back UCI in each of the plurality of target slots respectively; and transmitting, in accordance with the determined transmission duration or format of the PUCCH, the PUCCH carrying the to-be-fed-back UCI in each of the plurality of target slots.

Embodiments of the present disclosure further provide a computer readable storage medium storing therein a computer program, where the computer program is configured to be executed by a processor to implement following steps: determining a plurality of target slots to transmit to-be-fed-back uplink control information (UCI), where the to-be-fed-back UCI is transmitted in the target slots by using a physical uplink control channel (PUCCH); determining a transmission duration or format of the PUCCH carrying the to-be-fed-back UCI in each of the plurality of target slots respectively; and transmitting, in accordance with the determined transmission duration or format of the PUCCH, the PUCCH carrying the to-be-fed-back UCI in each of the plurality of target slots.

Embodiments of the present disclosure further provide an apparatus of receiving a physical uplink control channel (PUCCH), including: a third determination module, configured to determine a plurality of target slots to transmit to-be-fed-back uplink control information (UCI), where the to-be-fed-back UCI is transmitted in the target slots by using the PUCCH; a fourth determination module, configured to determine a transmission duration or format of the PUCCH carrying the to-be-fed-back UCI in each of the plurality of target slots respectively; and a reception module, configured to receive, in accordance with the determined transmission duration or format of the PUCCH, the PUCCH carrying the to-be-fed-back UCI in each of the plurality of target slots.

The third determination module includes: a seventh determination sub-module, configured to determine the plurality of target slots to transmit the to-be-fed-back UCI in accordance with predefined information of the plurality of target slots.

The apparatus further includes: a first information transmission module, configured to transmit information of the plurality of target slots to user equipment (UE) by means of a higher layer signaling or a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The apparatus further includes: an indication information transmission module, configured to transmit indication information to user equipment (UE) by means of a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots, such that the UE determines the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

The fourth determination module includes: an eighth determining sub-module, configured to determine the transmission duration or format of the PUCCH carrying the to-be-fed-back UCI in each of the plurality of target slots respectively in accordance with a size of an uplink region in each of the plurality of target slots or a size of an uplink region for a PUCCH transmission in each of the plurality of target slots.

The apparatus further includes: a second information transmission module, configured to transmit the transmission duration or format of the PUCCH in each target slot to user equipment (UE) by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The reception module includes: a transmission structure determination sub-module, configured to determine a transmission structure of the UCI and a reference signal (RS) in the PUCCH in each of the plurality of target slots respectively in accordance with the transmission duration or format of the PUCCH in each of the plurality of target slots; and a first reception sub-module, configured to receive, in accordance with the transmission structure of the UCI and the RS of the PUCCH in each of the plurality of target slots, the PUCCH carrying the to-be-fed-back UCI in each of the plurality of target slots respectively.

The apparatus further includes: a third position determination module, configured to determine, in accordance with a predetermined rule, a start position and/or an end position of the PUCCH in each of the plurality of target slots respectively.

The apparatus further includes: a third information transmission module, configured to transmit the determined start position and/or end position of the PUCCH in each of the plurality of target slots to user equipment (UE) by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

The reception module includes: a second reception sub-module, configured to, if a size of the to-be-fed-back UCI is less than or equal to a first preset value, receive a PUCCH carrying a modulation symbol in each of the plurality of target slots, where the modulation symbol results from a modulation performed by user equipment (UE) on the to-be-fed-back UCI; and a third reception sub-module, configured to, if the size of the to-be-fed-back UCI is greater than the first preset value, receive a PUCCH carrying a first bit sequence in each of the plurality of target slots; or, if the size of the to-be-fed-back UCI is greater than the first preset value, receive, in each of the plurality of target slots, a PUCCH carrying a bit sub-sequence of the second bit sequence that corresponds to the target slot, where the first bit sequence is a coded bit sequence resulting from a channel coding and rate matching performed by the UE on the to-be-fed-back UCI in accordance with a quantity of symbols carrying the UCI in the PUCCH, and the second bit sequence is a coded bit sequence resulting from a channel coding and rate matching performed by the UE on the to-be-fed-back UCI in accordance with a quantity of symbols carrying the UCI in the PUCCH and a quantity of the target slots.

The apparatus further includes: an information acquisition module, configured to acquire the to-be-fed-back UCI from the PUCCH.

The information acquisition module includes: a first information acquisition sub-module, configured to, if the size of the to-be-fed-back UCI is less than or equal to the first preset value, merge the modulation symbols received in the plurality of target slots and determine the to-be-fed-back UCI in accordance with a merged modulation symbol; and a second information acquisition sub-module, configured to, if the size of the to-be-fed-back UCI is greater than the first preset value, merge the first bit sequences received in the plurality of target slots and determine the to-be-fed-back UCI by decoding a merged first bit sequence, or merge modulation symbol sequences received in the plurality of target slots that correspond to the first bit sequence, derive the first bit sequence from a merged modulation symbol sequence, and determine the to-be-fed-back UCI by decoding the first bit sequence; or acquire the second bit sequence by cascading the bit sub-sequences of the second bit sequence received in the plurality of target slots, and determine the to-be-fed-back UCI by decoding the second bit sequence.

Embodiments of the present disclosure further provide a base station, including: a processor, a memory connected to the processor via a bus interface, and a transceiver connected to the processor via the bus interface, where the memory is configured to store program and data used by the processor in operation, the transceiver is configured to transmit a control command, and the processor is configured to call and execute the program and data stored in the memory to implement following steps: determining a plurality of target slots to transmit to-be-fed-back uplink control information (UCI), where the to-be-fed-back UCI is transmitted in the target slots by using the PUCCH; determining a transmission duration or format of the PUCCH carrying the to-be-fed-back UCI in each of the plurality of target slots respectively; and receiving, in accordance with the determined transmission duration or format of the PUCCH, the PUCCH carrying the to-be-fed-back UCI in each of the plurality of target slots.

Embodiments of the present disclosure further provide a computer readable storage medium storing therein a computer program, where the computer program is configured to be executed by a processor to implement following steps: determining a plurality of target slots to transmit to-be-fed-back uplink control information (UCI), where the to-be-fed-back UCI is transmitted in the target slots by using the PUCCH; determining a transmission duration or format of the PUCCH carrying the to-be-fed-back UCI in each of the plurality of target slots respectively; and, receiving, in accordance with the determined transmission duration or format of the PUCCH, the PUCCH carrying the to-be-fed-back UCI in each of the plurality of target slots.

The foregoing technical solutions provided by the present disclosure have at least following advantageous effects: according to the method of transmitting a PUCCH, the method of receiving a PUCCH, the apparatus, the user equipment (UE) and the base station, when the UE needs to transmit a PUCCH in a plurality of target slots, the UE determines a transmission duration or format of the PUCCH in each of the plurality of target slots respectively, and the UE transmits the PUCCH in accordance with the determined transmission duration or format of the PUCCH in each of the plurality of target slots, thereby allowing for PUCCH transmission in multiple slots.

DETAILED DESCRIPTION

To describe the technical problem to be solved, the technical solutions and the advantages of the present disclosure more clearly, specific embodiments are described in detail hereinafter with reference to the accompanying drawings.

Figure 1:
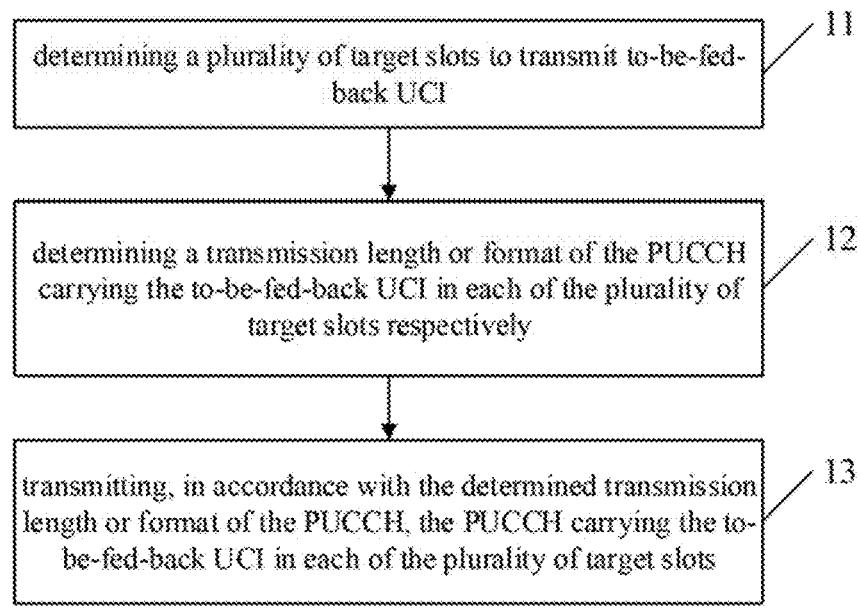
FIG. 1 illustrates a flow diagram of a method of transmitting a PUCCH provided by embodiments of the present disclosure.

As shown in FIG. 1, some embodiments of the present disclosure provide a method of transmitting a PUCCH, which includes following steps.

Step 11: determining a plurality of target slots to transmit to-be-fed-back UCI. The to-be-fed-back UCI is transmitted in the target slots by using the PUCCH.

In this step, the method of transmitting a PUCCH is generally applied to a UE side, that is, the UE determines the to-be-fed-back UCI and determines the to-be-fed-back UCI to be transmitted in multiple target slots by using the PUCCH.

Step 12: determining a transmission duration or format of the PUCCH carrying the to-be-fed-back UCI in each of the plurality of target slots respectively.

In this step, the transmission durations or formats of the PUCCH carrying the to-be-fed-back UCI in different target slots are determined by different specific target slot structures which may be same with or different from each other, which is not specifically limited herein.

Step 13: transmitting, in accordance with the determined transmission duration or format of the PUCCH, the PUCCH carrying the to-be-fed-back UCI in each of the plurality of target slots.

In this step, each transmission duration or format corresponds to a transmission structure, that is, the PUCCH carrying the to-be-fed-back UCI is transmitted by a corresponding transmission structure in each of the plurality of target slots.

Specifically, in the foregoing embodiment of the present disclosure, the step 11 includes: determining the plurality of target slots to transmit the to-be-fed-back UCI in accordance with predefined information of the plurality of target slots, information of the plurality of target slots may be predefined in accordance with a standard to which both UE and a base station have to adhere to; or determining the plurality of target slots to transmit the to-be-fed-back UCI in accordance with information of the plurality of target slots which is configured by a higher layer signaling; or determining the plurality of target slots to transmit the to-be-fed-back UCI by receiving information of the plurality of target slots which is transmitted by a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, the information of the plurality of target slots includes at least a quantity of the plurality of target slots and identifiers of the plurality of target slots, for example, four target slots: target slot 1, target slot 2, target slot 3 and target slot 4.

The step 12 in the foregoing embodiment of the present embodiment further includes: receiving the transmission duration or format, which is transmitted by a preset PDCCH, of the PUCCH carrying the to-be-fed-back UCI in each of the plurality of target slots, the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, that is, the indication fields of the preset PDCCH indicate respectively the transmission duration or format of the PUCCH in each of the plurality of target slots; or determining the transmission duration or format of the PUCCH carrying the to-be-fed-back UCI in each of the plurality of target slots respectively in accordance with a size of an uplink region contained in each target slot or a size of an uplink region for a PUCCH transmission contained in each target slot, for example, if it is assumed that the PUCCH occupies completely an uplink region of a slot or the region for a PUCCH transmission in the uplink region, then the transmission duration or format of the PUCCH may be determined by a quantity of symbols in the uplink region or the region for a PUCCH transmission in the uplink region; or receiving indication information transmitted by a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots; and determining the transmission duration or format of the PUCCH carrying the to-be-fed-back UCI in each of the plurality of target slots in accordance with a size of the uplink region for a PUCCH transmission in each of the plurality of slots, the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

It is noted, the transmission duration and the format of the PUCCH may correspond to each other in a one-to-one relationship, for example, one transmission duration corresponds to a single unique format, or one format corresponds to a single unique transmission duration. Alternatively, a single transmission duration may correspond to multiple formats, whereby a transmission duration may be determined by determining a format. Alternatively, a single format may correspond to multiple transmission durations, whereby a format may be determined by determining a transmission duration.

In the embodiments of the present disclosure, the plurality of target slots in which the to-be-fed-back UCI is transmitted may vary depending on the transmission start positions of different UE, however the resource set proposed in the present disclosure may be shared by multiple UE. As a result, the plurality of slots in a resource set may correspond to the plurality of target slots of certain UE in a one-to-one relationship, but the plurality of slots in the resource set are not the target slots of the UE, since the target slot is with respect to certain UE while the slots in the resource set are just meant to define a duration of the target slots corresponding to each UE. For example, the target slots in which UE1 transmits for the first time are slot 0 and slot 1, and the target slots in which UE1 transmits for the second time are slot 5 and slot 6. The target slots used in the two transmission are different, but the resource sets used are the same, and neither resource set for the slot 0 and slot 1 nor resource set for the slot 5 and slot 6 is defined or configured in advance. The resource set may just include two slots, the first slot is provided with an uplink region of 5 symbols and the second slot is provided with an uplink region of 6 symbols, whereby in the case that the resource set corresponds to the slot 0 and slot 1, the PUCCH in the slot 0 has a duration of 5 symbols and the PUCCH in the slot 1 has a duration of 6 symbols; the same is true in the case that the resource set corresponds to the slot 5 and slot 6, that is, the PUCCH in the slot 5 has a duration of 5 symbols and the PUCCH in the slot 6 has a duration of 6 symbols.

It is further noted, a quantity of slots included in each resource set may be the same. Here, the quantity of slots may be predetermined or configured by means of a higher layer signaling in advance. For example, a quantity Y of resource sets is predetermined or configured by means of the higher layer signaling in advance in accordance with a known quantity P of slots. Each resource set corresponds to P slots and further includes information of an uplink region for a PUCCH transmission in each of the P slots. For example, in defining or configuring each resource set, a size and/or start position and the like of the uplink region in each slot is defined or configured. Optionally, a plurality of different slot formats may be predefined or configured by means of the higher layer signaling in advance and each slot format corresponds to the size and/or start position of one such uplink region. In defining or configuring each resource set, a format of each slot of the P slots included in the resource set is defined or configured and a size and/or start position of the uplink region in the slot may be determined by the slot format. UE may determine one resource set in accordance with the indication information in the preset PDCCH, and determine, in accordance with the size of uplink region configured to transmit a PUCCH in each slot of the P slots of the resource set, the transmission duration or format of the PUCCH in a corresponding target slot. For example, the size of uplink region configured to transmit a PUCCH in the slot is used as the transmission duration of the PUCCH, or the format of the PUCCH is determined by the size of uplink region configured to transmit a PUCCH in the slot (one duration corresponds to one format). The information corresponding P slots in the resource set correspond sequentially to P target slots in which UE transmits the PUCCH.

Alternatively, a quantity of slots included in each resource set may not be entirely the same. The quantity of slots in each resource set may be predetermined or configured by means of a higher layer signaling in advance, or may instead be determined implicitly depending on a resource set indicated by the indication information in the PDCCH without configuration. The relevant information of each resource set is predetermined or configured by means of the higher layer signaling in advance by a known quantity of slots corresponding to each resource set, for example, a size and/or start position and the like of the uplink region configured to transmit the UCI in each slot of a resource set is defined directly. For example, a first resource set corresponds to a quantity P1 of slots and includes information of the uplink region configured to transmit a PUCCH in each slot of the P1 slots, a second resource set corresponds to a quantity P2 of slots and includes information of the uplink region configured to transmit a PUCCH in each slot of the P2 slots, and so on. Optionally, a plurality of different slot formats may be predefined or configured by means of a higher layer signaling in advance, and each slot format corresponds to the size and/or start position of one such uplink region. The format of each slot of the Pi slots included in the resource set i is defined or configured in defining or configuring the resource set i, and the size and/or start position of the uplink region in the slot may be determined by the slot format. For example, a slot format 1, slot format 2, slot format 3 and slot format 4 are predefined or configured to correspond respectively to different sizes and/or start positions of uplink regions; and a first resource set corresponds to P1 target slots and includes all slot formats of P1 slots, a second resource set corresponds to P2 slots and includes all slot formats of the P2 slots, and so on. UE may determine a resource set i by the indication information in the PDCCH. The UE may determine from the resource set i that the resource set includes information of Pi slots and as a result the UE needs to transmit a PUCCH in Pi slots. Further, the UE determines, in accordance with information of the uplink region configured to transmit a PUCCH in each slot of the Pi slots in the resource set, the transmission duration or format of the PUCCH in a corresponding target slot. For example, the size of uplink region configured to transmit a PUCCH in the slot is used as the transmission duration of the PUCCH, or the format of the PUCCH is determined by the size of uplink region configured to transmit a PUCCH in the slot (one duration corresponds to one format). The information corresponding Pi slots in the resource set i correspond sequentially to Pi target slots in which UE transmits the PUCCH.

In the foregoing process, correspondence between different resource sets and indication information may be expressed in form of a table in which different status of the indication information correspond to different resource set indices, however the correspondence may be expressed in other form as well, which is not specifically limited herein.

The step 13 in the foregoing embodiment of the present disclosure further includes: determining a transmission structure of the UCI and a reference signal (RS) in the PUCCH in each of the plurality of target slots respectively in accordance with the determined transmission duration or format of the PUCCH carrying the to-be-fed-back UCI in each of the plurality of target slots; and transmitting, in accordance with the transmission structure of the UCI and the RS of the PUCCH in each of the plurality of target slots, the PUCCH carrying the to-be-fed-back UCI in each of the plurality of target slots respectively.

In the foregoing embodiment of the present disclosure, one transmission duration or format corresponds to one transmission structure of UCI and RS, that is, a structure of mapping the UCI and RS for PUCCH may be determined by the transmission duration or format, namely, which symbols among multiple symbols occupied by the PUCCH are used to transmit the UCI, and which symbols are used to transmit the RS. For example, if the transmission duration is 7 symbols and the format is x1, the corresponding transmission structure of UCI and RS is UURRRUU (or URUURRU), where U denotes a symbol location among the 7 symbols that is configured to transmit the UCI and R denotes a symbol location among the 7 symbols that is configured to transmit the RS. For another example, if the transmission duration is 4 symbols and the format is x2, the corresponding transmission structure of UCI and RS is URRU (or RURU). In summary, if the transmission duration or format is determined, the corresponding transmission structure of UCI and RS may be determined and the UCI and RS maybe transmitted in PUCCH by the transmission structure.

It is noted, the foregoing transmission structures are merely optional embodiments of the present disclosure and there may be other structures, and different structures of UCI and RS are possible on account of different transmission durations and whether there is frequency hopping between symbols, which is not a focus of the present disclosure and therefore a detailed description thereof is omitted.

In the foregoing embodiment of the present disclosure, since the plurality of target slots may include a same uplink region or uplink region for a PUCCH transmission, or different uplink regions or uplink regions for a PUCCH transmission, with transmission duration or formats of the PUCCH in different target slots being given, the positions of PUCCH in the plurality of target slots may be same or different. Therefore, in order to determine the position of PUCCH carrying the to-be-fed-back UCI more accurately, it is necessary to further determine start positions and/or end positions of the PUCCH in the plurality of target slots in the method of transmitting a PUCCH provided by embodiments of the present disclosure.

Specifically, determining start positions and/or end positions of the PUCCH in the plurality of target slots further includes: receiving start position and/or end position, transmitted by a preset PDCCH, of the PUCCH in each of one or more target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; and/or, determining, in accordance with a predetermined rule, start position and/or end position of the PUCCH in each of one or more target slots.

Specifically, when there is a PDCCH (i.e., the preset PDCCH) corresponding to the PUCCH, the start symbol position and/or end symbol position of the PUCCH in the first target slot of the plurality of target slots are/is determined by an indication field of the PDCCH corresponding to the PUCCH, and the start positions and/or end positions of the PUCCH in other target slots of the plurality of target slots are determined by a predetermined rule. For example, it is predetermined that the uplink region in the target slot or the uplink region for a PUCCH transmission is occupied completely, or it is predetermined that the PUCCH starts from the Ath symbol of the uplink region in the target slot or the uplink region for a PUCCH transmission, or it is predetermined that the PUCCH ends at the Bth symbol from the bottom of the uplink region in the target slot or the uplink region for a PUCCH transmission.

Alternatively, when there is a PDCCH corresponding to the PUCCH, the start position and/or end position of PDCCH for each target slot of the plurality of target slots is determined, that is, each target slot of the plurality target slots corresponds to a separate indication.

Alternatively, start position and/or end position of the PUCCH in each target slot of the plurality of target slots are/is determined by the predetermined rule. For example, it is predetermined that the uplink region in the target slot or the uplink region for a PUCCH transmission is occupied completely, or it is predetermined that the PUCCH starts from the Ath symbol of the uplink region in the target slot or the uplink region for a PUCCH transmission, or it is predetermined that the PUCCH ends at the Bth symbol from the bottom of the uplink region in the target slot or the uplink region for a PUCCH transmission.

It is noted that, if information indicating a target slot structure is not acquired (i.e., the uplink region in the target slot or the uplink region for a PUCCH transmission cannot be determined), or if the size of the uplink region in a target slot (or the size of the uplink region for a PUCCH transmission) is less than a determined transmission duration or a transmission duration corresponding to a determined format, or if the start position and/or end position determined by indications of the preset PDCCH or by a predetermined rule do/does not coincide with the uplink region in the target slot or the uplink region for a PUCCH transmission (e.g., the indicated start position and/or end position do/does not fall in the range), UE may skip the target slot and resume transmission in a next target slot (the target slot may or may not be included in a quantity N of target slots, where N is a predetermined quantity of target slots configured to transmit UCI).

Further, in the foregoing scenario, if UE has received a preset PDCCH and the preset PDCCH indicates the start position and/or end position of the PUCCH, the UE may transmit the PUCCH in the target slot in accordance with the indicated start position and/or end position and a determined transmission duration or a transmission duration corresponding to a determined format (i.e., UE always transmits by indicated positions, irrespective of uplink/downlink resource allocation in the target slot and a size of the uplink region or a region for a PUCCH transmission in the uplink region). Alternatively, in the foregoing scenario, the UE always transmits the PUCCH in the target slot in accordance with the start position and/or end position determined by a predetermined rule in the target slot and a determined transmission duration or a transmission duration corresponding to a determined format (i.e., UE always transmits by indicated positions, irrespective of uplink/downlink resource allocation in the target slot and a size of the uplink region or a region for a PUCCH transmission in the uplink region).

The step 13 in the foregoing embodiment of the present disclosure further includes: if a size of the to-be-fed-back UCI is less than or equal to a first preset value, acquiring a modulation symbol by modulating the to-be-fed-back UCI, and transmitting a PUCCH carrying the modulation symbol repeatedly in each of the plurality of target slots; the first preset value may generally be set to 2 bits, that is, when the to-be-fed-back UCI is 1 bit or 2 bits in duration, one modulation symbol is acquired by modulating the 1-bit or 2-bit UCI, and the resultant one modulation symbol is transmitted repeatedly in a PUCCH of a corresponding transmission duration or format in each of the plurality of target slots; if the size of the to-be-fed-back UCI is greater than the first preset value, acquiring a first coded bit sequence by performing a channel coding and rate matching on the to-be-fed-back UCI in accordance with a quantity of symbols carrying the UCI in the PUCCH, and transmitting a PUCCH carrying the first coded bit sequence repeatedly in each of the plurality of target slots; that is, when the to-be-fed-back UCI is greater than 2 bits, a channel coding and rate matching is performed on the to-be-fed-back UCI based on a quantity of symbols carrying the UCI in the PUCCH of a corresponding transmission duration or format, to acquire a first coded bit sequence, and the first coded bit sequence is transmitted repeatedly in each of the plurality of target slots; or, if the size of the to-be-fed-back UCI is greater than the first preset value, acquiring a second coded bit sequence by performing a channel coding and rate matching on the to-be-fed-back UCI in accordance with a quantity of symbols carrying the UCI in the PUCCH and a quantity of the target slots, and transmitting, in each of the plurality of target slots, a PUCCH carrying a bit sub-sequence of the second coded bit sequence that corresponds to the target slot; that is, when the to-be-fed-back UCI is greater than 2 bits, a channel coding and rate matching is performed on the to-be-fed-back UCI based on a quantity of symbols carrying the UCI in the PUCCH of a corresponding transmission duration or format and a quantity of the target slots, to acquire the second coded bit sequence, and a bit sub-sequence corresponding to the target slot is taken from the second bit sequence to be transmitted in the target slot. For example, the second bit sequence is 111000111, and a quantity of target slots is 3, namely target slot 1, target slot 2 and target slot 3. A bit sub-sequence corresponding to the target slot 1 is 111, a bit sub-sequence corresponding to the target slot 2 is 000 and a bit sub-sequence corresponding to the target slot 3 is 111. Thus, a PUCCH carrying the bit sub-sequence of 111 is transmitted in the target slot 1, a PUCCH carrying the bit sub-sequence of 000 is transmitted in the target slot 2 and a PUCCH carrying the bit sub-sequence of 111 is transmitted in the target slot 3.

In summary, according to the method of transmitting a PUCCH provided by the foregoing embodiment of the present disclosure, when UE needs to transmit a PUCCH in a plurality of target slots, the UE determines a transmission duration or format of the PUCCH in each of the plurality of target slots respectively, and the UE transmits the PUCCH in accordance with the determined transmission duration or format of the PUCCH in each of the plurality of target slots, thereby allowing for PUCCH transmission in multiple slots.

Figure 2:
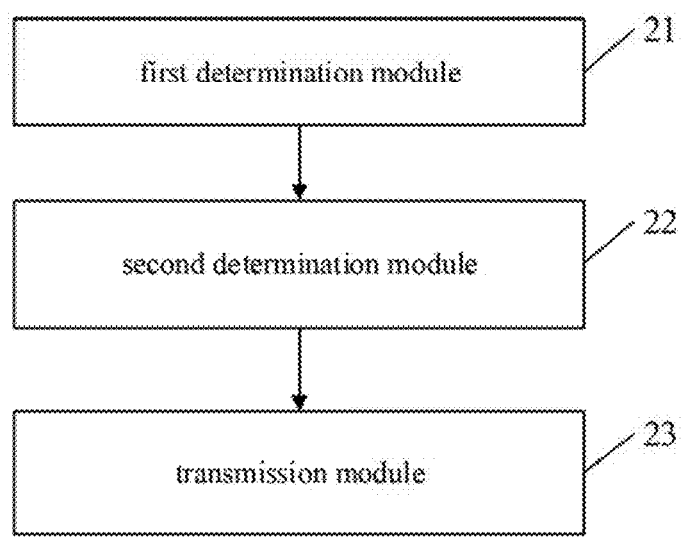
FIG. 2 illustrates a structural diagram of an apparatus of transmitting a PUCCH provided by embodiments of the present disclosure.

To better achieve the aforementioned objective, as shown in FIG. 2, embodiments of the present disclosure further provide an apparatus of transmitting a PUCCH, including: a first determination module 21, configured to determine a plurality of target slots to transmit to-be-fed-back UCI, where the to-be-fed-back UCI is transmitted in the target slots by using the PUCCH; a second determination module 22, configured to determine a transmission duration or format of the PUCCH carrying the to-be-fed-back UCI in each of the plurality of target slots respectively; and a transmission module 23, configured to transmit, in accordance with the determined transmission duration or format of the PUCCH, the PUCCH carrying the to-be-fed-back UCI in each of the plurality of target slots.

Specifically, in the foregoing embodiment of the present disclosure, the first determination module includes: a first determination sub-module, configured to determine the plurality of target slots to transmit the to-be-fed-back UCI in accordance with predefined information of the plurality of target slots; and/or a second determination sub-module, configured to determine the plurality of target slots to transmit the to-be-fed-back UCI in accordance with information of the plurality of target slots which is configured by a higher layer signaling; and/or a third determination sub-module, configured to determine the plurality of target slots to transmit the to-be-fed-back UCI by receiving information of the plurality of target slots which is transmitted by a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, in the foregoing embodiment of the present disclosure, the second determination module includes: a fourth determination sub-module, configured to receive the transmission duration or format, which is transmitted by a preset PDCCH, of the PUCCH carrying the to-be-fed-back UCI in each of the plurality of target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; and/or a fifth determination sub-module, configured to determine the transmission duration or format of the PUCCH carrying the to-be-fed-back UCI in each of the plurality of target slots respectively in accordance with a size of an uplink region contained in each target slot or a size of an uplink region for a PUCCH transmission contained in each target slot; and/or a sixth determination sub-module, configured to receive indication information transmitted by a preset PDCCH, where the indication information indicates at least one resource set of a quantity Y of resource sets for multi-slot transmission which are pre-defined or configured by means of a higher layer signaling in advance, each resource set includes at least information of an uplink region for a PUCCH transmission in each of a plurality of slots; and determine the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

Specifically, in the foregoing embodiment of the present disclosure, the transmission module includes: a structure determination sub-module, configured to determine a transmission structure of the UCI and a reference signal (RS) in the PUCCH in each of the plurality of target slots respectively in accordance with the determined transmission duration or format of the PUCCH carrying the to-be-fed-back UCI in each of the plurality of target slots; and a first transmission sub-module, configured to transmit, in accordance with the transmission structure of the UCI and the RS of the PUCCH in each of the plurality of target slots, the PUCCH carrying the to-be-fed-back UCI in each of the plurality of target slots respectively.

Specifically, in the foregoing embodiment of the present disclosure, the apparatus further includes: a first position determination module, configured to receive start position and/or end position, transmitted by a preset PDCCH, of the PUCCH in each of one or more target slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot; and/or a second position determination module, configured to determine, in accordance with a predetermined rule, start position and/or end position of the PUCCH in each of one or more target slots.

Specifically, in the foregoing embodiment of the present disclosure, the transmission module includes: a second transmission sub-module, configured to, if a size of the to-be-fed-back UCI is less than or equal to a first preset value, acquire a modulation symbol by modulating the to-be-fed-back UCI, and transmit a PUCCH carrying the modulation symbol repeatedly in each of the plurality of target slots; and a third transmission sub-module, configured to, if the size of the to-be-fed-back UCI is greater than the first preset value, acquire a first coded bit sequence by performing a channel coding and rate matching on the to-be-fed-back UCI in accordance with a quantity of symbols carrying the UCI in the PUCCH, and transmit a PUCCH carrying the first coded bit sequence repeatedly in each of the plurality of target slots; or, if the size of the to-be-fed-back UCI is greater than the first preset value, acquire a second coded bit sequence by performing a channel coding and rate matching on the to-be-fed-back UCI in accordance with a quantity of symbols carrying the UCI in the PUCCH and a quantity of the target slots, and transmit, in each of the plurality of target slots, a PUCCH carrying a bit sub-sequence of the second coded bit sequence that corresponds to the target slot.

In summary, according to the apparatus of transmitting a PUCCH provided by the foregoing embodiment of the present disclosure, when UE needs to transmit a PUCCH in a plurality of target slots, the UE determines a transmission duration or format of the PUCCH in each of the plurality of target slots respectively, and the UE transmits the PUCCH in accordance with the determined transmission duration or format of the PUCCH in each of the plurality of target slots, thereby allowing for PUCCH transmission in multiple slots.

It is noted, the apparatus of transmitting a PUCCH provided by the foregoing embodiment of the present disclosure is an apparatus corresponding to the foregoing method of transmitting a PUCCH, and all embodiments of the method of transmitting a PUCCH is applicable to the apparatus of transmitting a PUCCH and may achieve the same or like advantageous effect.

Figure 3:
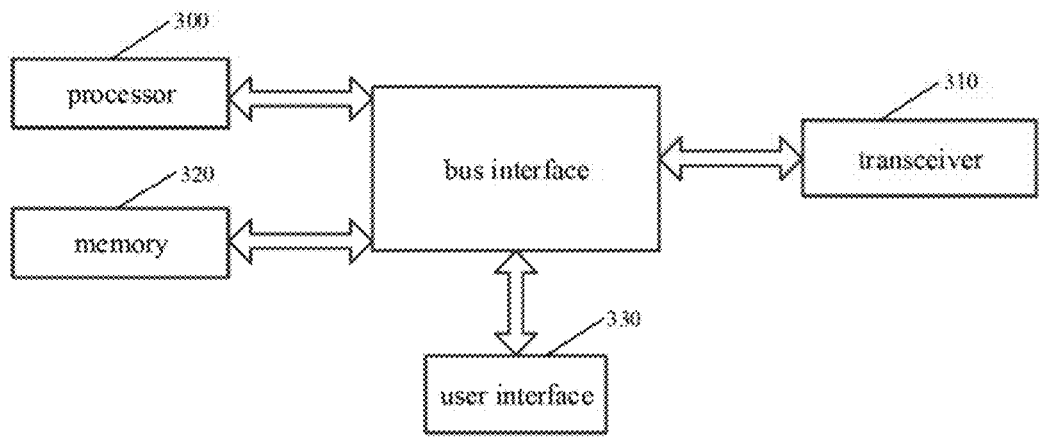
FIG. 3 illustrates a structural diagram of UE provided by embodiments of the present disclosure.

To better achieve the aforementioned objective, as shown in FIG. 3, embodiments of the present disclosure further provide UE, including: a processor 300, a memory 320 connected to the processor 300 via a bus interface, and a transceiver 310 connected to the processor 300 via the bus interface, where the memory 320 is configured to store program and data used by the processor 300 in operation, the transceiver 310 is configured to transmit a control command, and the processor 300 is configured to call and execute the program and data stored in the memory 320 to implement following steps: determining a plurality of target slots to transmit to-be-fed-back UCI, where the to-be-fed-back UCI is transmitted in the target slots by using a PUCCH; determining a transmission duration or format of the PUCCH carrying the to-be-fed-back UCI in each of the plurality of target slots respectively; and transmitting, in accordance with the determined transmission duration or format of the PUCCH, the PUCCH carrying the to-be-fed-back UCI in each of the plurality of target slots.

In FIG. 3, a bus architecture may include any quantity of interconnected buses and bridges, such that various circuits including one or more processors represented by the processor 300 and memories represented by the memory 320 are connected to each other. The bus architecture may also connect various other circuits such as peripherals, voltage regulators and power management circuits, which is well known in the art. Therefore, a detailed description thereof is omitted herein. Bus interface acts as an interface. The transceiver 310 may include multiple elements, such as a receiver and a transmitter, to allow for communication with various other apparatuses on the transmission medium. For different user equipment, user interface 330 may be an interface configured to connect to a requisite device externally or internally, and the connected device includes, but not limited to: a keypad, display, speaker, microphone, joystick, etc.

The processor 300 is responsible for manage the bus architecture and normal processing and the memory 320 may store the data being used by the processor 300 during operation.

In summary, according to the UE provided by the foregoing embodiment of the present disclosure, when UE needs to transmit a PUCCH in a plurality of target slots, the UE determines a transmission duration or format of the PUCCH in each of the plurality of target slots respectively, and the UE transmits the PUCCH in accordance with the determined transmission duration or format of the PUCCH in each of the plurality of target slots, thereby allowing for PUCCH transmission in multiple slots.

It is noted, the UE provided by the foregoing embodiment of the present disclosure is UE corresponding to the foregoing method of transmitting a PUCCH, and all embodiments of the method of transmitting a PUCCH is applicable to the UE and may achieve the same or like advantageous effect.

To better achieve the aforementioned objective, embodiments of the present disclosure further provide a computer readable storage medium storing therein a computer program, where the computer program is configured to be executed by a processor to implement following steps: determining a plurality of target slots to transmit to-be-fed-back UCI, where the to-be-fed-back UCI is transmitted in the target slots by using a PUCCH; determining a transmission duration or format of the PUCCH carrying the to-be-fed-back UCI in each of the plurality of target slots respectively; and transmitting, in accordance with the determined transmission duration or format of the PUCCH, the PUCCH carrying the to-be-fed-back UCI in each of the plurality of target slots.

The computer readable storage medium includes permanent medium and non-permanent medium, removable medium and non-removable medium which may achieve information storage by means of any method or technique. Information may include computer readable instruction, data structure, program module or other data. Example of computer storage medium includes, but not limited to: phase change random access memory (PRAM), static random access memory (SRAM), dynamic random access memory (DRAM), other type of random access memory (RAM), read-only memory (ROM), electrically erasable programmable ROM (EEPROM), flash memory or other memory technique, compact disc read-only memory (CD-ROM), digital versatile disc (DVD) or other optical storage, magnetic cassette, magnetic tape, magnetic disk or other magnetic storage device, or any other non-transmission medium suitable for storing information accessible by a computing device. As defined herein, the computer readable medium does not include transitory media, such as modulated data signal and carrier wave.

It is noted, the computer readable storage medium provided by the foregoing embodiment of the present disclosure is a computer readable storage medium corresponding to the foregoing method of transmitting a PUCCH, and all embodiments of the method of transmitting a PUCCH is applicable to the computer readable storage medium and may achieve the same or like advantageous effect.

Figure 4:
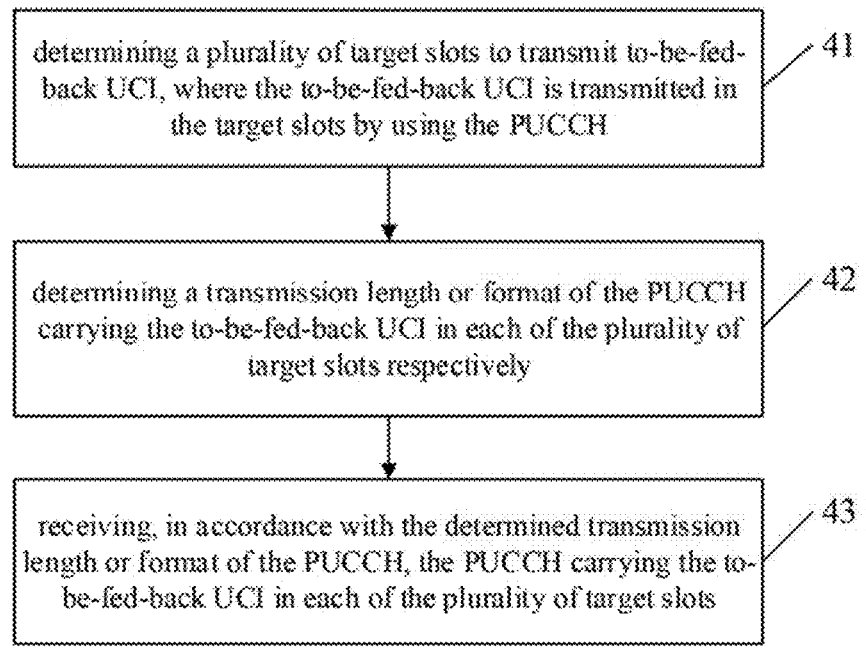
FIG. 4 illustrates a flow diagram of a method of receiving a PUCCH provided by embodiments of the present disclosure.

To describe the method of transmitting a PUCCH more clearly, as shown in FIG. 4, embodiments of the present disclosure further provide a method of receiving a PUCCH, which is applied to a base station side and includes following steps.

Step 41: determining a plurality of target slots to transmit to-be-fed-back UCI, where the to-be-fed-back UCI is transmitted in the target slots by using the PUCCH.

In this step, the method of transmitting a PUCCH is generally applied to a UE side, that is, the UE determines the to-be-fed-back UCI and the determined to-be-fed-back UCI is transmitted in multiple target slots by using the PUCCH.

Step 42: determining a transmission duration or format of the PUCCH carrying the to-be-fed-back UCI in each of the plurality of target slots respectively.

In this step, the transmission durations or formats of the PUCCH carrying the to-be-fed-back UCI in different target slots are determined by different specific target slot structures which may be the same or different from each other, which is not specifically limited herein.

Step 43: receiving, in accordance with the determined transmission duration or format of the PUCCH, the PUCCH carrying the to-be-fed-back UCI in each of the plurality of target slots.

In this step, each transmission duration or format corresponds to a transmission structure, that is, the PUCCH carrying the to-be-fed-back UCI is transmitted by a corresponding transmission structure in each of the plurality of target slots.

Specifically, in the foregoing embodiment of the present disclosure, the step 41 includes: determining the plurality of target slots to transmit the to-be-fed-back UCI in accordance with predefined information of the plurality of target slots. Information of the plurality of target slots may be predefined in accordance with a standard to which both UE and a base station have to adhere to. Specifically, the information of the plurality of target slots includes at least a quantity of the plurality of target slots and identifiers of the plurality of target slots, for example, four target slots: target slot 1, target slot 2, target slot 3 and target slot 4.

Further, in the foregoing embodiment of the present disclosure, after the step 41, the method includes: transmitting information of the plurality of target slots to UE by means of a higher layer signaling or a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, the step 42 in the foregoing embodiment of the present disclosure includes: determining the transmission duration or format of the PUCCH carrying the to-be-fed-back UCI in each of the plurality of target slots respectively in accordance with a size of an uplink region in each of the plurality of target slots or a size of an uplink region for a PUCCH transmission in each of the plurality of target slots. For example, if it is always assumed that the PUCCH occupies completely an uplink region of a slot or the region for a PUCCH transmission in the uplink region, then the transmission duration or format of the PUCCH may be determined by a quantity of symbols in the uplink region of the slot or the region for a PUCCH transmission in the uplink region.

It is noted, the transmission duration and the format of the PUCCH may correspond to each other in a one-to-one relationship, for example, one transmission duration corresponds to a single unique format, or one format corresponds to a single unique transmission duration. Alternatively, a single transmission duration may correspond to multiple formats, whereby a transmission duration may be determined by determining a format. Alternatively, a single format may correspond to multiple transmission durations, whereby a format may be determined by determining a transmission duration.

Further, in the foregoing embodiment of the present disclosure, after the step 42, the method further includes: transmitting the transmission duration or format of the PUCCH in each target slot to UE by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Further, in the foregoing embodiment of the present disclosure, after the step 41, the method further includes: transmitting indication information to UE by means of a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots, such that the UE determines the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

It is noted, the foregoing step implies a step that the base station should select at least one resource set from a quantity Y of resource sets predefined or configured by means of a higher layer signaling in advance for UE. In one case, the base station may firstly determine a transmission duration or format of PUCCH in each slot, then determine at least one corresponding resource set from the plurality of resource sets by the transmission duration or format, and transmit indication information indicating the determined resource set to UE for the UE to determine the transmission duration or format of PUCCH in each slot, and the base station may detect PUCCH in each slot by the determined transmission duration or format of PUCCH. In another case, the base station determines a slot format of each slot, selects at least one resource set corresponding to the determined slot formats of multiple slots from the plurality of resource sets, and transmits indication information indicating the determined resource set to UE for the UE to determine the transmission duration or format of PUCCH in each slot, and the base station may determine, in a same manner as the UE, the transmission duration or format of PUCCH in each slot by the slot format of each slot, then the base station may detect PUCCH in each slot by the determined transmission duration or format of PUCCH.

It is further noted, a quantity of slots included in each resource set may be the same. Here, the quantity of slots may be predetermined or configured by means of a higher layer signaling in advance. For example, a quantity Y of resource sets is predetermined or configured by means of the higher layer signaling in advance in accordance with a known quantity P of slots. Each resource set corresponds to P slots and further includes information of an uplink region for a PUCCH transmission in each of the P slots. For example, in defining or configuring each resource set, a size and/or start position and the like of the uplink region in each slot is defined or configured. Optionally, a plurality of different slot formats may be predefined or configured by means of the higher layer signaling in advance and each slot format corresponds to the size and/or start position of one such uplink region. In defining or configuring each resource set, a format of each slot of the P slots included in the resource set is defined or configured and a size and/or start position of the uplink region in the slot may be determined by the slot format. UE may determine one resource set in accordance with the indication information in the preset PDCCH, and determine, in accordance with the size of uplink region configured to transmit a PUCCH in each slot of the P slots of the resource set, the transmission duration or format of the PUCCH in a corresponding target slot. For example, the size of uplink region configured to transmit a PUCCH in the slot is used as the transmission duration of the PUCCH, or the format of the PUCCH is determined by the size of uplink region configured to transmit a PUCCH in the slot (one duration corresponds to one format). The information of corresponding P slots in the resource set correspond sequentially to P target slots in which UE transmits the PUCCH.

Alternatively, a quantity of slots included in each resource set may not be entirely the same. The quantity of slots in each resource set may be predetermined or configured by means of a higher layer signaling in advance, or may instead be determined implicitly depending on a resource set indicated by the indication information in the PDCCH without configuration. The relevant information of each resource set is predetermined or configured by means of the higher layer signaling in advance by a known quantity of slots corresponding to each resource set, for example, a size and/or start position and the like of the uplink region configured to transmit the UCI in each slot of a resource set is defined directly. For example, a first resource set corresponds to a quantity P1 of slots and includes information of the uplink region configured to transmit a PUCCH in each slot of the P1 slots, a second resource set corresponds to a quantity P2 of slots and includes information of the uplink region configured to transmit a PUCCH in each slot of the P2 slots, and so on. Optionally, a plurality of different slot formats may be predefined or configured by means of a higher layer signaling in advance, and each slot format corresponds to the size and/or start position of one such uplink region. The format of each slot of the Pi slots included in the resource set i is defined or configured in defining or configuring the resource set i, and the size and/or start position of the uplink region in the slot may be determined by the slot format. For example, a slot format 1, slot format 2, slot format 3 and slot format 4 are predefined or configured to correspond respectively to different sizes and/or start positions of uplink regions; and a first resource set corresponds to P1 target slots and includes all slot formats of P1 slots, a second resource set corresponds to P2 slots and includes all slot formats of the P2 slots, and so on. UE may determine a resource set i by the indication information in the PDCCH. The UE may determine from the resource set i that the resource set includes information of Pi slots and as a result the UE needs to transmit a PUCCH in Pi slots. Further, the UE determines, in accordance with information of the uplink region configured to transmit a PUCCH in each slot of the Pi slots in the resource set, the transmission duration or format of the PUCCH in a corresponding target slot. For example, the size of uplink region configured to transmit a PUCCH in the slot is used as the transmission duration of the PUCCH, or the format of the PUCCH is determined by the size of uplink region configured to transmit a PUCCH in the slot (one duration corresponds to one format). The information of corresponding Pi slots in the resource set i correspond sequentially to Pi target slots in which UE transmits the PUCCH.

In the foregoing process, correspondence between different resource sets and indication information may be expressed in form of a table in which different status of the indication information correspond to different resource set indices, however the correspondence may be expressed in other form as well, which is not specifically limited herein.

Specifically, the step 43 in the foregoing embodiment of the present disclosure includes: determining a transmission structure of the UCI and a reference signal (RS) in the PUCCH in each of the plurality of target slots respectively in accordance with the transmission duration or format of the PUCCH in each of the plurality of target slots, and transmitting, in accordance with the transmission structure of the UCI and the RS of the PUCCH in each of the plurality of target slots, the PUCCH carrying the to-be-fed-back UCI in each of the plurality of target slots respectively.

In the foregoing embodiment of the present disclosure, one transmission duration or format corresponds to one transmission structure of UCI and RS, that is, a structure of mapping the UCI and RS for PUCCH may be determined by the transmission duration or format, namely, which symbols among multiple symbols occupied by the PUCCH are used to transmit the UCI, and which symbols are used to transmit the RS. For example, if the transmission duration is 7 symbols and the format is x1, the corresponding transmission structure of UCI and RS is UURRRUU (or URUURRU), where U denotes a symbol location among the 7 symbols that is configured to transmit the UCI and R denotes a symbol location among the 7 symbols that is configured to transmit the RS. For another example, if the transmission duration is 4 symbols and the format is x2, the corresponding transmission structure of UCI and RS is URRU (or RURU). In summary, if the transmission duration or format is determined, the corresponding transmission structure of UCI and RS may be determined and the UCI and RS maybe transmitted in PUCCH by the transmission structure.

It is noted, the foregoing transmission structures are merely optional embodiments of the present disclosure and there may be other structures, and different structures of UCI and RS are possible on account of different transmission durations and whether there is frequency hopping between symbols, which is not a focus of the present disclosure and therefore a detailed description thereof is omitted.

In the foregoing embodiment of the present disclosure, since the plurality of target slots may include a same uplink region or uplink region for a PUCCH transmission, or different uplink regions or uplink regions for a PUCCH transmission, with transmission duration or formats of the PUCCH in different target slots being given, the positions of PUCCH in the plurality of target slots may be same or different. Therefore, in order to determine the position of PUCCH carrying the to-be-fed-back UCI more accurately, it is necessary to further determine start positions and/or end positions of the PUCCH in the plurality of target slots in the method of transmitting a PUCCH provided by embodiments of the present disclosure.

Specifically, determining start positions and/or end positions of the PUCCH in the plurality of target slots further includes: determining, in accordance with a predetermined rule, start position and/or end position of the PUCCH in each target slot.

The method of receiving a PUCCH provided by embodiments of the present disclosure further includes: transmitting the determined start position and/or end position of the PUCCH in each target slot to UE by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, when there is a PDCCH (i.e., the preset PDCCH) corresponding to the PUCCH, the start symbol position and/or end symbol position of the PUCCH in the first target slot of the plurality of target slots are/is determined by an indication field of the PDCCH corresponding to the PUCCH, and the start positions and/or end positions of the PUCCH in other target slots of the plurality of target slots are determined by a predetermined rule. For example, it is predetermined that the uplink region in the target slot or the uplink region for a PUCCH transmission is occupied completely, or it is predetermined that the PUCCH starts from the Ath symbol of the uplink region in the target slot or the uplink region for a PUCCH transmission, or it is predetermined that the PUCCH ends at the Bth symbol from the bottom of the uplink region in the target slot or the uplink region for a PUCCH transmission.

Alternatively, when there is a PDCCH corresponding to the PUCCH, the PDCCH indicates the start position and/or end position for each target slot of the plurality of target slots, that is, each target slot of the plurality target slots corresponds to a separate indication.

Alternatively, start position and/or end position of the PUCCH in each target slot of the plurality of target slots are/is determined by the predetermined rule. For example, it is predetermined that the uplink region in the target slot or the uplink region for a PUCCH transmission is occupied completely, or it is predetermined that the PUCCH starts from the Ath symbol of the uplink region in the target slot or the uplink region for a PUCCH transmission, or it is predetermined that the PUCCH ends at the Bth symbol from the bottom of the uplink region in the target slot or the uplink region for a PUCCH transmission.

It is noted that, if information indicating a target slot structure is not acquired (i.e., the uplink region in the target slot or the uplink region for a PUCCH transmission cannot be determined), or if the size of the uplink region in a target slot (or the size of the uplink region for a PUCCH transmission in a target slot) is less than a determined transmission duration or a transmission duration corresponding to a determined format, or if the start position and/or end position determined by indications of the preset PDCCH or by a predetermined rule do/does not coincide with the uplink region in the target slot or the uplink region for a PUCCH transmission (e.g., the indicated start position and/or end position do/does not fall in the range). UE may skip the target slot and resume transmission in a next target slot (the target slot may or may not be included in a quantity N of target slots, where N is a predetermined quantity of target slots configured to transmit UCI).

Further, in the foregoing scenario, if UE has received a preset PDCCH and the preset PDCCH indicates the start position and/or end position of the PUCCH, the UE may transmit the PUCCH in the target slot in accordance with the indicated start position and/or end position and a determined transmission duration or a transmission duration corresponding to a determined format (i.e., UE always transmits by indicated positions, irrespective of uplink/downlink resource allocation in the target slot and a size of the uplink region or a region for a PUCCH transmission in the uplink region). Alternatively, in the foregoing scenario, the UE always transmits the PUCCH in the target slot in accordance with the start position and/or end position determined by a predetermined rule in the target slot and a determined transmission duration or a transmission duration corresponding to a determined format (i.e., UE always transmits by indicated positions, irrespective of uplink/downlink resource allocation in the target slot and a size of the uplink region or a region for a PUCCH transmission in the uplink region).

Specifically, the step 43 in the foregoing embodiment of the present disclosure includes: if a size of the to-be-fed-back UCI is less than or equal to a first preset value, receiving a PUCCH carrying the modulation symbol in each of the plurality of target slots, where the modulation symbol results from a modulation performed by UE on the to-be-fed-back UCI; the first preset value may generally be set to 2 bits, that is, when the to-be-fed-back UCI is 1 bit or 2 bits in duration, one modulation symbol is acquired by modulating the 1-bit or 2-bit UCI, and the resultant one modulation symbol is transmitted repeatedly in a PUCCH of a corresponding transmission duration or format in each of the plurality of target slots; if the size of the to-be-fed-back UCI is greater than the first preset value, receiving a PUCCH carrying a first bit sequence in each of the plurality of target slots; that is, when the to-be-fed-back UCI is greater than 2 bits, a channel coding and rate matching is performed on the to-be-fed-back UCI based on a quantity of symbols carrying the UCI in the PUCCH of a corresponding transmission duration or format, to acquire a first coded bit sequence, and the first coded bit sequence is transmitted repeatedly in each of the plurality of target slots; or, if the size of the to-be-fed-back UCI is greater than the first preset value, receiving, in each of the plurality of target slots, a PUCCH carrying a bit sub-sequence of the second bit sequence that corresponds to the target slot; that is, when the to-be-fed-back UCI is greater than 2 bits, a channel coding and rate matching is performed on the to-be-fed-back UCI based on a quantity of symbols carrying the UCI in the PUCCH of a corresponding transmission duration or format and a quantity of the target slots, to acquire the second coded bit sequence, and a bit sub-sequence corresponding to the target slot is taken from the second bit sequence to be transmitted in the target slot. For example, the second bit sequence is 111000111, and a quantity of target slots is 3, namely target slot 1, target slot 2 and target slot 3. A bit sub-sequence corresponding to the target slot 1 is 111, a bit sub-sequence corresponding to the target slot 2 is 000 and a bit sub-sequence corresponding to the target slot 3 is 111. Thus, a PUCCH carrying the bit sub-sequence of 111 is transmitted in the target slot 1, a PUCCH carrying the bit sub-sequence of 000 is transmitted in the target slot 2 and a PUCCH carrying the bit sub-sequence of 111 is transmitted in the target slot 3.

The first bit sequence is a coded bit sequence resulting from a channel coding and rate matching performed by the UE on the to-be-fed-back UCI in accordance with a quantity of symbols carrying the UCI in the PUCCH, and the second bit sequence is a coded bit sequence resulting from a channel coding and rate matching performed by the UE on the to-be-fed-back UCI in accordance with a quantity of symbols carrying the UCI in the PUCCH and a quantity of the target slots.

Still further, in the foregoing embodiment of the present disclosure, after the base station receives the PUCCH, the method further includes step 44: acquiring the to-be-fed-back UCI from the PUCCH.

The step 44 includes specifically: if the size of the to-be-fed-back UCI is less than or equal to the first preset value, merging the modulation symbols received in the plurality of target slots (a merge of modulation symbols, or a merge of bits) and determining the to-be-fed-back UCI in accordance with a merged modulation symbol; and if the size of the to-be-fed-back UCI is greater than the first preset value, merging the first bit sequences received in the plurality of target slots and determining the to-be-fed-back UCI by decoding a merged first bit sequence, or merging modulation symbol sequences received in the plurality of target slots that correspond to the first bit sequence, deriving the first bit sequence from a merged modulation symbol sequence, and determining the to-be-fed-back UCI by decoding the first bit sequence, that is, the base station acquires the UCI transmitted by UE by merging information received in each target slot; or acquiring the second bit sequence by cascading the bit sub-sequences of the second bit sequence received in the plurality of target slots, and determining the to-be-fed-back UCI by decoding the second bit sequence, that is, the base station cascades information received in each target slot and performs a channel decoding on the cascaded information to acquire the UCI transmitted by UE.

In summary, according to the method of receiving a PUCCH provided by the foregoing embodiment of the present disclosure, when UE needs to transmit a PUCCH in a plurality of target slots, the base station determines a transmission duration or format of the PUCCH in each of the plurality of target slots respectively, and the base station receives the PUCCH in accordance with the determined transmission duration or format of the PUCCH in each of the plurality of target slots, thereby allowing for PUCCH transmission in multiple slots.

Figure 5:
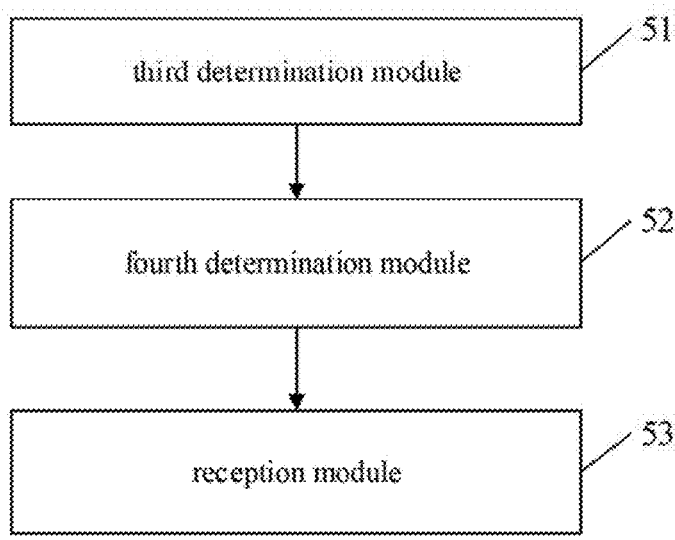
FIG. 5 illustrates a structural diagram of an apparatus of receiving a PUCCH provided by embodiments of the present disclosure.

To better achieve the aforementioned objective, as shown in FIG. 5, embodiments of the present disclosure further provide an apparatus of receiving a PUCCH, including: a third determination module 51, configured to determine a plurality of target slots to transmit to-be-fed-back UCI, where the to-be-fed-back UCI is transmitted in the target slots by using the PUCCH; a fourth determination module 52, configured to determine a transmission duration or format of the PUCCH carrying the to-be-fed-back UCI in each of the plurality of target slots respectively; and a reception module 53, configured to receive, in accordance with the determined transmission duration or format of the PUCCH, the PUCCH carrying the to-be-fed-back UCI in each of the plurality of target slots.

Specifically, the third determination module in the foregoing embodiment of the present disclosure includes: a seventh determination sub-module, configured to determine the plurality of target slots to transmit the to-be-fed-back UCI in accordance with predefined information of the plurality of target slots.

Specifically, the apparatus of the foregoing embodiment of the present disclosure further includes: a first information transmission module, configured to transmit information of the plurality of target slots to UE by means of a higher layer signaling or a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, the apparatus of the foregoing embodiment of the present disclosure further includes: an indication information transmission module, configured to transmit indication information to UE by means of a preset PDCCH, where the indication information indicates at least one resource set of a quantity Y of resource sets for multi-slot transmission which are predefined or configured by means of a higher layer signaling in advance, each resource set includes at least information of an uplink region for a PUCCH transmission in each of a plurality of slots, such that the UE determines the transmission duration or format of the PUCCH carrying the to-be-fed-back UCI in each of the plurality of target slots in accordance with a size of the uplink region for a PUCCH transmission in each of the plurality of slots, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot, and Y is an integer greater than or equal to 2.

Specifically, the fourth determination module in the foregoing embodiment of the present disclosure includes: an eighth determining sub-module, configured to determine the transmission duration or format of the PUCCH carrying the to-be-fed-back UCI in each of the plurality of target slots respectively in accordance with a size of an uplink region in each of the plurality of target slots or a size of an uplink region for a PUCCH transmission in each of the plurality of target slots.

Specifically, the apparatus of the foregoing embodiment of the present disclosure further includes: a second information transmission module, configured to transmit the transmission duration or format of the PUCCH in each target slot to UE by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, the reception module in the foregoing embodiment of the present disclosure includes: a transmission structure determination sub-module, configured to determine a transmission structure of the UCI and a reference signal (RS) in the PUCCH in each of the plurality of target slots respectively in accordance with the transmission duration or format of the PUCCH in each of the plurality of target slots; and a first reception sub-module, configured to transmit, in accordance with the transmission structure of the UCI and the RS of the PUCCH in each of the plurality of target slots, the PUCCH carrying the to-be-fed-back UCI in each of the plurality of target slots respectively.

Specifically, the apparatus of the foregoing embodiment of the present disclosure further includes: a third position determination module, configured to determine, in accordance with a predetermined rule, a start position and/or an end position of the PUCCH in each of the plurality of target slots respectively.

Specifically, the apparatus of the foregoing embodiment of the present disclosure further includes: a third information transmission module, configured to transmit the determined start position and/or end position of the PUCCH in each of the plurality of target slots to UE by means of a preset PDCCH, where the preset PDCCH includes at least one of: a PDCCH corresponding to a PDSCH for which the UCI is fed back in the PUCCH, a PDCCH indicating a downlink semi-persistent scheduling resource release for which the UCI is fed back in the PUCCH, or a multicast PDCCH indicating a slot format of the target slot.

Specifically, the reception module in the foregoing embodiment of the present disclosure includes: a second reception sub-module, configured to, if a size of the to-be-fed-back UCI is less than or equal to a first preset value, receive a PUCCH carrying a modulation symbol in each of the plurality of target slots, where the modulation symbol results from a modulation performed by UE on the to-be-fed-back UCI; and a third reception sub-module, configured to, if the size of the to-be-fed-back UCI is greater than the first preset value, receive a PUCCH carrying a first bit sequence in each of the plurality of target slots; or, if the size of the to-be-fed-back UCI is greater than the first preset value, receive, in each of the plurality of target slots, a PUCCH carrying a bit sub-sequence of the second bit sequence that corresponds to the target slot, where the first bit sequence is a coded bit sequence resulting from a channel coding and rate matching performed by the UE on the to-be-fed-back UCI in accordance with a quantity of symbols carrying the UCI in the PUCCH, and the second bit sequence is a coded bit sequence resulting from a channel coding and rate matching performed by the UE on the to-be-fed-back UCI in accordance with a quantity of symbols carrying the UCI in the PUCCH and a quantity of the target slots.

Specifically, the apparatus of the foregoing embodiment of the present disclosure further includes: an information acquisition module, configured to acquire the to-be-fed-back UCI from the PUCCH.

Specifically, the information acquisition module in the foregoing embodiment of the present disclosure includes: a first information acquisition sub-module, configured to, if the size of the to-be-fed-back UCI is less than or equal to the first preset value, merge the modulation symbols received in the plurality of target slots and determine the to-be-fed-back UCI in accordance with a merged modulation symbol; and a second information acquisition sub-module, configured to, if the size of the to-be-fed-back UCI is greater than the first preset value, merge the first bit sequences received in the plurality of target slots and determine the to-be-fed-back UCI by decoding a merged first bit sequence, or merge modulation symbol sequences received in the plurality of target slots that correspond to the first bit sequence, derive the first bit sequence from a merged modulation symbol sequence, and determine the to-be-fed-back UCI by decoding the first bit sequence, or acquire the second bit sequence by cascading the bit sub-sequences of the second bit sequence received in the plurality of target slots, and determine the to-be-fed-back UCI by decoding the second bit sequence.

In summary, according to the apparatus of receiving a PUCCH provided by the foregoing embodiment of the present disclosure, when UE needs to transmit a PUCCH in a plurality of target slots, the base station determines a transmission duration or format of the PUCCH in each of the plurality of target slots respectively, and the base station receives the PUCCH in accordance with the determined transmission duration or format of the PUCCH in each of the plurality of target slots, thereby allowing for PUCCH transmission in multiple slots.

It is noted, the apparatus of receiving a PUCCH provided by the foregoing embodiment of the present disclosure is an apparatus corresponding to the foregoing method of receiving a PUCCH, and all embodiments of the method of receiving a PUCCH is applicable to the apparatus of receiving a PUCCH and may achieve the same or like advantageous effect.

Figure 6:
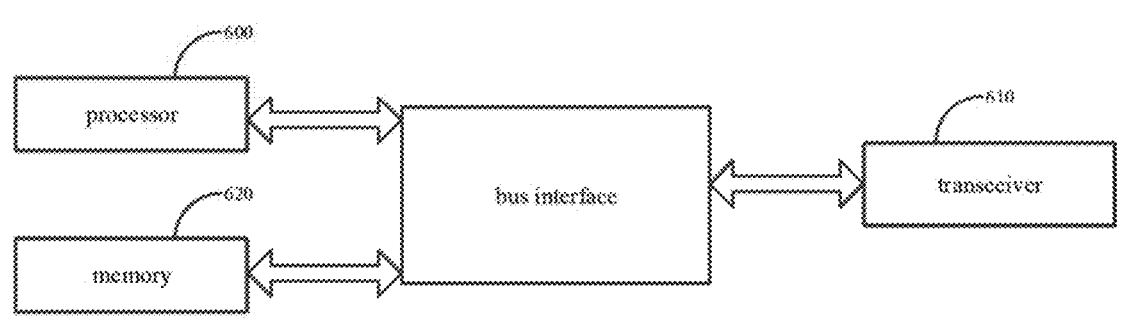
FIG. 6 illustrates a structural diagram of a base station provided by embodiments of the present disclosure.

To better achieve the aforementioned objective, as shown in FIG. 6, embodiments of the present disclosure further provide a base station, including: a processor 600, a memory 620 connected to the processor 600 via a bus interface, and a transceiver 610 connected to the processor 600 via the bus interface, where the memory 620 is configured to store program and data used by the processor 6400 in operation, the transceiver 610 is configured to transmit a control command, and the processor 600 is configured to call and execute the program and data stored in the memory 620 to implement following steps: determining a plurality of target slots to transmit to-be-fed-back UCI, where the to-be-fed-back UCI is transmitted in the target slots by using the PUCCH; determining a transmission duration or format of the PUCCH carrying the to-be-fed-back UCI in each of the plurality of target slots respectively; and receiving, in accordance with the determined transmission duration or format of the PUCCH, the PUCCH carrying the to-be-fed-back UCI in each of the plurality of target slots.

In FIG. 6, a bus architecture may include any quantity of interconnected buses and bridges, such that various circuits including one or more processors represented by the processor 600 and memories represented by the memory 620 are connected to each other. The bus architecture may also connect various other circuits such as peripherals, voltage regulators and power management circuits, which is well known in the art. Therefore, a detailed description thereof is omitted herein. Bus interface acts as an interface. The transceiver 610 may include multiple elements, such as a receiver and a transmitter, to allow for communication with various other apparatuses on the transmission medium. The processor 600 is responsible for supervising the bus architecture and normal operation and the memory 620 may store the data being used by the processor 600 during operation.

In summary, according to the base station provided by the foregoing embodiment of the present disclosure, when UE needs to transmit a PUCCH in a plurality of target slots, the base station determines a transmission duration or format of the PUCCH in each of the plurality of target slots respectively, and the base station receives the PUCCH in accordance with the determined transmission duration or format of the PUCCH in each of the plurality of target slots, thereby allowing for PUCCH transmission in multiple slots.

It is noted, the base station provided by the foregoing embodiment of the present disclosure is a base station corresponding to the foregoing method of receiving a PUCCH, and all embodiments of the method of receiving a PUCCH is applicable to the base station and may achieve the same or like advantageous effect.

To better achieve the aforementioned objective, embodiments of the present disclosure further provide a computer readable storage medium storing therein a computer program, where the computer program is configured to be executed by a processor to implement following steps: determining a plurality of target slots to transmit to-be-fed-back UCI, where the to-be-fed-back UCI is transmitted in the target slots by using a PUCCH; determining a transmission duration or format of the PUCCH carrying the to-be-fed-back UCI in each of the plurality of target slots respectively; and receiving, in accordance with the determined transmission duration or format of the PUCCH, the PUCCH carrying the to-be-fed-back UCI in each of the plurality of target slots.

The computer readable storage medium includes permanent medium and non-permanent medium, removable medium and non-removable medium which may achieve information storage by means of any method or technique. Information may include computer readable instruction, data structure, program module or other data. Example of computer storage medium includes, but not limited to: phase change random access memory (PRAM), static random access memory (SRAM), dynamic random access memory (DRAM), other type of random access memory (RAM), read-only memory (ROM), electrically erasable programmable ROM (EEPROM), flash memory or other memory technique, compact disc read-only memory (CD-ROM), digital versatile disc (DVD) or other optical storage, magnetic cassette, magnetic tape, magnetic disk or other magnetic storage device, or any other non-transmission medium suitable for storing information accessible by a computing device. As defined herein, the computer readable medium does not include transitory media, such as modulated data signal and carrier wave.

It is noted, the computer readable storage medium provided by the foregoing embodiment of the present disclosure is a computer readable storage medium corresponding to the foregoing method of receiving a PUCCH, and all embodiments of the method of receiving a PUCCH is applicable to the computer readable storage medium and may achieve the same or like advantageous effect.

To better achieve the foregoing objective, the method of transmitting a PUCCH and the method of receiving a PUCCH provided by embodiments of the present disclosure are illustrated with reference to the accompanying drawings.

Assume that one slot includes 7 symbols (OFDM or single carrier frequency division multiple access (SC-FDMA) symbol) and it is determined by agreement or configured that one PUCCH is transmitted in two target slots. In case that it is configured, it may be configured in advance by means of a higher layer signaling, e.g., for a periodic channel state information/scheduling request (CSI/SR) feedback; or may be configured by means of a PDCCH, e.g., for an acknowledgement/negative acknowledgement (ACK/NACK) feedback. The hybrid automatic repeat request (HARQ) feedback time sequence may be: an ACK/NACK for a downlink transmission in a previous slot is fed back in an uplink region of a current slot, or an ACK/NACK for a downlink transmission in a current slot is fed back in an uplink region of the current slot. The HARQ feedback time sequence may be predefined, or may be configured by means of a higher layer signaling or a related indication field in the PDCCH.

Figure 7:
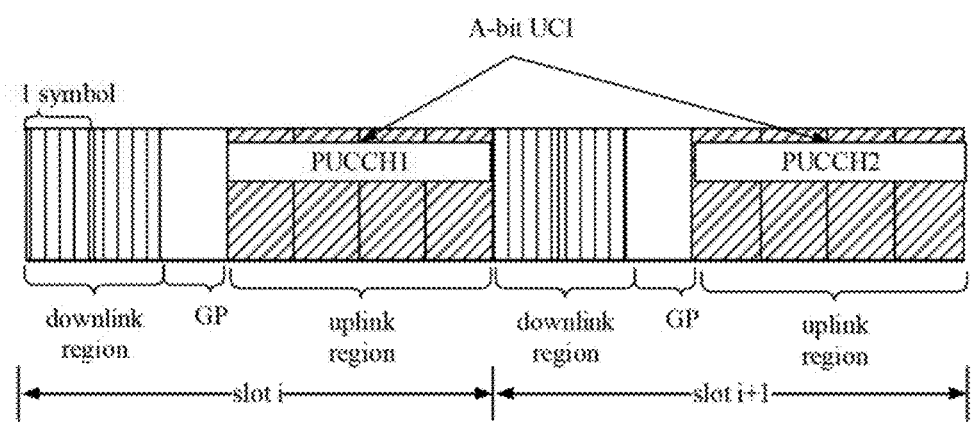
FIG. 7 illustrates a first diagram of slots in a specific application of the method provided by embodiments of the present disclosure.

Scenario 1: the uplink regions in a plurality of target slots are the same, as shown in FIG. 7, both structures of slots i and i+1 include a downlink region of 2 symbols, a guard period (GP) of 1 symbol, and an uplink region of 4 symbols.

UE determines, according to a feedback period of periodic UCI, that CSI/SR feedback is to be conducted in slot i and determines that a transmission duration of the PUCCH is 4 symbols by a predetermined duration or a duration configured by means of a higher layer signaling in advance or a size of an uplink region (or a region for a PUCCH transmission in the uplink region) in at least one of two slots. Optionally, the UE determines, by the HARQ feedback time sequence, that ACK/NACK feedback is to be conducted in slot i and determines that a transmission duration of the PUCCH is 4 symbols by a predetermined duration, a duration configured by means of a higher layer signaling in advance, a size of an uplink region (or a region for a PUCCH transmission in the uplink region) in at least one of two slots, or an indication field in a PDCCH corresponding to the PUCCH.

Then the PUCCH is transmitted by a UCI+RS structure with a duration of 4 symbols in both uplink regions of slots i and i+1, as shown by PUCCH1 and PUCCH2 in FIG. 7, in which the PUCCH transmission starts at the first symbol of the uplink region in each slot. Of course, the start position and/or end position of the PUCCH in the uplink region may be informed by signaling, for example, informed by means of a corresponding PDCCH, whereby the PUCCH may be transmitted on any part of symbols of the uplink region. The position may be informed for the first slot only, or the position may be informed by corresponding signaling for every slot, as a result, the transmission positions in different slots may vary.

When UCI is no more than 2 bits in duration, the UCI is transmitted repeatedly in every slot. The UCI is transmitted in every slot by a determined UCI+RS structure corresponding to a same transmission duration. The base station receives the PUCCH in slots i and i+1 by the same transmission duration and merges UCI in these two slots to acquire final UCI. When the UCI is greater than 2 bits in duration, the UCI may be transmitted repeatedly in every slot, that is, UE performs a channel coding and rate matching based on a quantity of transmission symbols of UCI in the UCI+RS structure determined by the transmission duration, and then transmits a same coded sequence in two slots repeatedly. The base station receives the PUCCH in slots i and i+1 by the same transmission duration and merges UCI received in these two slots to acquire final UCI information. Alternatively, a joint coding transmission on the two slots may be performed, that is, UE performs a channel coding and rate matching based on a sum of transmission symbols of UCI in the UCI+RS structures determined by the transmission duration in the two slots, and divides a coded sequence into two portions for transmission in the two slots respectively. The base station receives the PUCCH in slots i and i+1 by the same transmission duration, cascades UCI information received in these two slots and performs a channel decoding on the cascaded UCI to acquire final UCI information.

Figure 8:
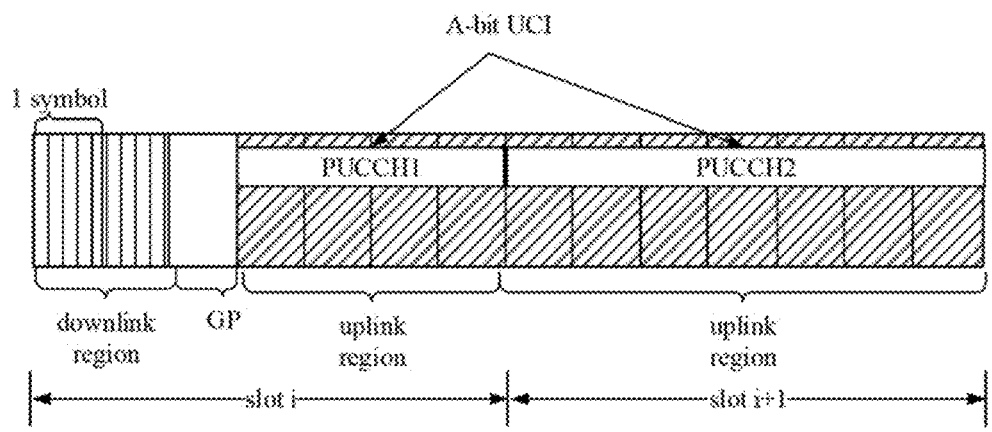
FIG. 8 illustrates a second diagram of slots in a specific application of the method provided by embodiments of the present disclosure.

Scenario 2: the uplink regions in a plurality of target slots are different, as shown in FIG. 8, a structure of slots i includes: 2 symbols for downlink transmission, 1 symbol as a guard period (GP), and 4 symbols for uplink transmission; while slot i+1 has a full-uplink structure, that is, all 7 symbols are used for uplink transmission.

UE determines, by a feedback period of periodic UCI, that CSI/SR feedback is to be conducted in slot i, and determines that a transmission duration of the PUCCH is 4 symbols in slot i and a transmission duration of the PUCCH is 7 symbols in slot i+1 by a duration configured by means of a higher layer signaling in advance or a size of an uplink region (or a region for a PUCCH transmission in the uplink region) in each of the two slots. Optionally, the UE determines, by the HARQ feedback time sequence, that ACK/NACK feedback is to be conducted in slot i, and determines that a transmission duration of the PUCCH is 4 symbols in slot i and a transmission duration of the PUCCH is 7 symbols in slot i+1 by a duration configured by means of a higher layer signaling in advance, a size of an uplink region (or a region for a PUCCH transmission in the uplink region) in each of the two slots, or an indication field in a PDCCH corresponding to the PUCCH.

Then the PUCCH is transmitted in the uplink regions of slot i and slot i+1 by a UCI+RS structure with a duration of 4 symbols and a UCI+RS structure with a duration of 7 symbols respectively, as shown by PUCCH1 and PUCCH2 in FIG. 8, in which the PUCCH transmission ends at the last symbol of uplink region in every slot, that is, if the uplink region is greater than the transmission duration, the last several symbols are always occupied for transmission. Of course, the PUCCH transmission may starts at the first symbol of uplink region in every slot, that is, if the uplink region is greater than the transmission duration, the first several symbols are always occupied for transmission. Of course, the start position and/or end position of the PUCCH in the uplink region may be informed by signaling, for example, informed by means of a corresponding PDCCH, whereby the PUCCH may be transmitted on any part of symbols of the uplink region. The position may be informed for the first slot only, or the position may be informed by corresponding signaling for every slot, as a result, the transmission positions in different slots may vary. The transmission method in case that UCI is no greater than 2 bits in duration or is greater than 2 bits in duration is the same as that of the above scenario 1, and a detailed description is omitted herein.

Figure 9:
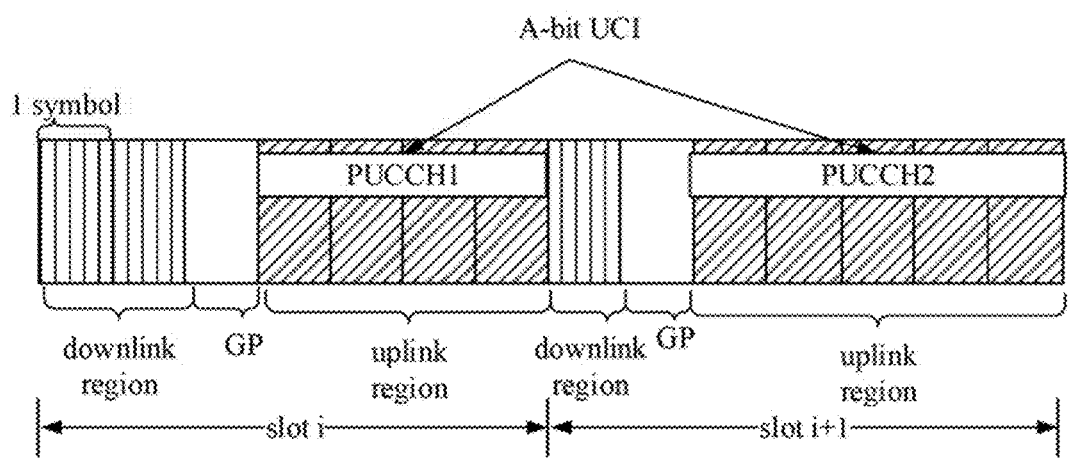
FIG. 9 illustrates a third diagram of slots in a specific application of the method provided by embodiments of the present disclosure.

Scenario 3: the uplink regions in a plurality of target slots are different, as shown in FIG. 9, a structure of slots i includes: 2 symbols for downlink transmission, 1 symbol as a guard period (GP), and 4 symbols for uplink transmission; while a structure of slots i+1 includes: 1 symbol for downlink transmission, 1 symbol as a guard period (GP), and S symbols for uplink transmission.

UE determines, by a feedback period of periodic UCI, that CSI/SR feedback is to be conducted in slot i, and determines that a transmission duration of the PUCCH is 4 symbols in slot i and a transmission duration of the PUCCH is 5 symbols in slot i+1 by a duration configured by means of a higher layer signaling in advance or a size of an uplink region (or a region for a PUCCH transmission in the uplink region) in each of the two slots. Optionally, the UE determines, by the HARQ feedback time sequence, that ACK NACK feedback is to be conducted in slot i, and determines that a transmission duration of the PUCCH is 4 symbols in slot i and a transmission duration of the PUCCH is 5 symbols in slot i+1 by a duration configured by means of a higher layer signaling in advance, a size of an uplink region (or a region for a PUCCH transmission in the uplink region) in each of the two slots, or an indication field in a PDCCH corresponding to the PUCCH.

Then the PUCCH is transmitted in the uplink regions of slot i and slot i+1 by a UCI+RS structure with a duration of 4 symbols and a UCI+RS structure with a duration of S symbols respectively, as shown by PUCCH1 and PUCCH2 in FIG. 9, in which the PUCCH transmission ends at the last symbol of uplink region in every slot, that is, if the uplink region is greater than the transmission duration, the last several symbols are always occupied for transmission. Of course, the PUCCH transmission may starts at the first symbol of uplink region in every slot, that is, if the uplink region is greater than the transmission duration, the first several symbols are always occupied for transmission. Of course, the start position and/or end position of the PUCCH in the uplink region may be informed by signaling, for example, informed by means of a corresponding PDCCH, whereby the PUCCH may be transmitted on any part of symbols of the uplink region. The position may be informed for the first slot only, or the position may be informed by corresponding signaling for every slot, as a result, the transmission positions in different slots may vary. The transmission method in case that UCI is no greater than 2 bits in duration or is greater than 2 bits in duration is the same as that of the above scenario 1, and a detailed description is omitted herein.

It is noted, the slot structures in the above embodiments are for exemplification only, the same operation principle may apply to the case that each slot includes 14 symbols. The PUCCH of a transmission duration of 4 symbols (or a format corresponding to the transmission duration of 4 symbols) is for exemplification only, the PUCCH may be transmitted by using a duration of another quantity of symbols/another format, e.g., a duration of any integer quantity of symbols ranging from 4 to 14, and the same operation principle as above may apply thereto. The above description merely takes the case in which PUCCH occupies the uplink region completely for example, in case that a subset of the uplink region is configured in advance for PUCCH transmission, the transmission duration of the PUCCH may certainly be determined by the size of the region configured to transmit PUCCH in the uplink region; if the configuration is performed by means of a signaling, the transmission duration of PUCCH may be smaller than the size of the UL region or the region configured to transmit PUCCH, and the same operation principle as above may apply thereto.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A method of transmitting a physical uplink control channel (PUCCH), comprising:
   determining a plurality of target slots to transmit to-be-fed-back uplink control information (UCI), wherein the to-be-fed-back UCI is transmitted in the target slots by using the PUCCH;
   determining a transmission duration or format of the PUCCH carrying the to-be-fed-back UCI in each of the plurality of target slots respectively; and,
   transmitting, in accordance with the determined transmission duration or format of the PUCCH, the PUCCH carrying the to-be-fed-back UCI in each of the plurality of target slots,
   wherein the transmitting the PUCCH carrying the to-be-fed-back UCI in each of the plurality of target slots comprises:
   when a size of the to-be-fed-back UCI is less than or equal to a first preset value, acquiring a modulation symbol by modulating the to-be-fed-back UCI, and transmitting a PUCCH carrying the modulation symbol repeatedly in each of the plurality of target slots; and
   when the size of the to-be-fed-back UCI is greater than the first preset value, acquiring a first coded bit sequence by performing a channel coding and rate matching on the to-be-fed-back UCI in accordance with a quantity of symbols carrying the UCI in the PUCCH, and transmitting a PUCCH carrying the first coded bit sequence repeatedly in each of the plurality of target slots; or, when the size of the to-be-fed-back UCI is greater than the first preset value, acquiring a second coded bit sequence by performing a channel coding and rate matching on the to-be-fed-back UCI in accordance with a quantity of symbols carrying the UCI in the PUCCH and a quantity of the target slots, and transmitting, in each of the plurality of target slots, a PUCCH carrying a bit sub-sequence of the second coded bit sequence that corresponds to the target slot.

2. The method according to claim 1, wherein the determining the plurality of target slots to transmit the to-be-fed-back UCI comprises:
   determining the plurality of target slots to transmit the to-be-fed-back UCI in accordance with predefined information of the plurality of target slots; or,
   determining the plurality of target slots to transmit the to-be-fed-back UCI in accordance with information of the plurality of target slots which is configured by a higher layer signaling; or,
   receiving information of the plurality of target slots which is transmitted by a preset physical downlink control channel (PDCCH), determining the plurality of target slots to transmit the to-be-fed-back UCI, wherein the preset PDCCH comprises at least one of: a PDCCH corresponding to a physical downlink shared channel (PDSCH) for which the UCI is fed back in the PUCCH, a PDCCH indicating a downlink semi-persistent scheduling (SPS) resource release for which the UCI is fed back in the PUCCH, or a multicast PDCCH indicating a slot format of the target slot.

3. The method according to claim 1, wherein the determining the transmission duration or format of the PUCCH carrying the to-be-fed-back UCI in each of the plurality of target slots respectively comprises:
   receiving the transmission duration or format, which is transmitted by a preset PDCCH, of the PUCCH carrying the to-be-fed-back UCI in each of the plurality of target slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot; or,
   determining the transmission duration or format of the PUCCH carrying the to-be-fed-back UCI in each of the plurality of target slots respectively in accordance with a size of an uplink region contained in each target slot or a size of an uplink region for a PUCCH transmission contained in each target slot; or,
   receiving indication information transmitted by a preset PDCCH, wherein the indication information indicates at least one resource set of a quantity Y of resource sets for multi-slot transmission which are predefined or configured by means of a higher layer signaling in advance, each resource set comprises at least information of an uplink region for a PUCCH transmission in each of a plurality of slots; and determining the transmission duration or format of the PUCCH carrying the to-be-fed-back UCI in each of the plurality of target slots in accordance with a size of the uplink region for a PUCCH transmission in each of the plurality of slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot, and Y is an integer greater than or equal to 2.

4. The method according to claim 1, wherein the transmitting, in accordance with the determined transmission duration or format of the PUCCH, the PUCCH carrying the to-be-fed-back UCI in each of the plurality of target slots comprises:
   determining a transmission structure of the UCI and a reference signal (RS) of the PUCCH in each of the plurality of target slots respectively in accordance with the determined transmission duration or format of the PUCCH carrying the to-be-fed-back UCI in each of the plurality of target slots; and
   transmitting, in accordance with the transmission structure of the UCI and the RS of the PUCCH in each of the plurality of target slots, the PUCCH carrying the to-be-fed-back UCI in each of the plurality of target slots respectively.

5. The method according to claim 4, further comprising:
   receiving start position and/or end position, transmitted by a preset PDCCH, of the PUCCH in each of one or more target slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot; and/or,
   determining, in accordance with a predetermined rule, start position and/or end position of the PUCCH in each of one or more target slots.

6. A method of receiving a physical uplink control channel (PUCCH), comprising:
   determining a plurality of target slots to transmit to-be-fed-back uplink control information (UCI), wherein the to-be-fed-back UCI is transmitted in the target slots by using the PUCCH;
   determining a transmission duration or format of the PUCCH carrying the to-be-fed-back UCI in each of the plurality of target slots respectively; and,
   receiving, in accordance with the determined transmission duration or format of the PUCCH, the PUCCH carrying the to-be-fed-back UCI in each of the plurality of target slots,
   wherein the receiving the PUCCH carrying the to-be-fed-back UCI in each of the plurality of target slots comprises:
   when a size of the to-be-fed-back UCI is less than or equal to a first preset value, receiving a PUCCH carrying a modulation symbol in each of the plurality of target slots, wherein the modulation symbol results from a modulation performed by user equipment (UE) on the to-be-fed-back UCI; and
   when the size of the to-be-fed-back UCI is greater than the first preset value, receiving a PUCCH carrying a first bit sequence in each of the plurality of target slots; or,
   when the size of the to-be-fed-back UCI is greater than the first preset value, receiving, in each of the plurality of target slots, a PUCCH carrying a bit sub-sequence of the second bit sequence that corresponds to the target slot,
   wherein the first bit sequence is a coded bit sequence resulting from a channel coding and rate matching performed by the UE on the to-be-fed-back UCI in accordance with a quantity of symbols carrying the UCI in the PUCCH, and the second bit sequence is a coded bit sequence resulting from a channel coding and rate matching performed by the UE on the to-be-fed-back UCI in accordance with a quantity of symbols carrying the UCI in the PUCCH and a quantity of the target slots.

7. The method according to claim 6, wherein the determining the plurality of target slots to transmit the to-be-fed-back UCI comprises:
- determining the plurality of target slots to transmit the to-be-fed-back UCI in accordance with predefined information of the plurality of target slots; or
- transmitting information of the plurality of target slots to user equipment (UE) by means of a higher layer signaling or a preset PDCCH, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot.

8. The method according to claim 6, wherein the determining the transmission duration or format of the PUCCH carrying the to-be-fed-back UCI in each of the plurality of target slots respectively comprises:
- determining the transmission duration or format of the PUCCH carrying the to-be-fed-back UCI in each of the plurality of target slots respectively in accordance with a size of an uplink region in each of the plurality of target slots or a size of an uplink region for a PUCCH transmission in each of the plurality of target slots; or
- transmitting the transmission duration or format of the PUCCH in each target slot to user equipment (UE) by means of a preset PDCCH, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot; or
- transmitting indication information to user equipment (UE) by means of a preset PDCCH, wherein the indication information indicates at least one resource set of a quantity Y of resource sets for multi-slot transmission which are predefined or configured by means of a higher layer signaling in advance, each resource set comprises at least information of an uplink region for a PUCCH transmission in each of a plurality of slots, such that the UE determines the transmission duration or format of the PUCCH carrying the to-be-fed-back UCI in each of the plurality of target slots in accordance with a size of the uplink region for a PUCCH transmission in each of the plurality of slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot, and Y is an integer greater than or equal to 2.

9. The method according to claim 6, wherein the receiving, in accordance with the determined transmission duration or format of the PUCCH, the PUCCH carrying the to-be-fed-back UCI in each of the plurality of target slots comprises:
- determining a transmission structure of the UCI and a reference signal (RS) in the PUCCH in each of the plurality of target slots respectively in accordance with the transmission duration or format of the PUCCH in each of the plurality of target slots; and
- transmitting, in accordance with the transmission structure of the UCI and the RS of the PUCCH in each of the plurality of target slots, the PUCCH carrying the to-be-fed-back UCI in each of the plurality of target slots respectively.

10. The method according to claim 9, further comprising:
- determining, in accordance with a predetermined rule, a start position and/or an end position of the PUCCH in each of the plurality of target slots respectively;
- transmitting the determined start position and/or end position of the PUCCH in each of the plurality of target slots to user equipment (UE) by means of a preset PDCCH, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot.

11. A User equipment (UE), comprising: a processor, a memory connected to the processor via a bus interface, and a transceiver connected to the processor via the bus interface, wherein the memory is configured to store program and data used by the processor in operation, the transceiver is configured to transmit a control command, and the processor is configured to call and execute the program and data stored in the memory to implement following steps:
- determining a plurality of target slots to transmit to-be-fed-back uplink control information (UCI), wherein the to-be-fed-back UCI is transmitted in the target slots by using a physical uplink control channel (PUCCH);
- determining a transmission duration or format of the PUCCH carrying the to-be-fed-back UCI in each of the plurality of target slots respectively; and,
- transmitting, in accordance with the determined transmission duration or format of the PUCCH, the PUCCH carrying the to-be-fed-back UCI in each of the plurality of target slots,
- wherein the transmitting the PUCCH carrying the to-be-fed-back UCI in each of the plurality of target slots comprises:
- when a size of the to-be-fed-back UCI is less than or equal to a first preset value, acquiring a modulation symbol by modulating the to-be-fed-back UCI, and transmitting a PUCCH carrying the modulation symbol repeatedly in each of the plurality of target slots; and
- when the size of the to-be-fed-back UCI is greater than the first preset value, acquiring a first coded bit sequence by performing a channel coding and rate matching on the to-be-fed-back UCI in accordance with a quantity of symbols carrying the UCI in the PUCCH, and transmitting a PUCCH carrying the first coded bit sequence repeatedly in each of the plurality of target slots;
- or, when the size of the to-be-fed-back UCI is greater than the first preset value, acquiring a second coded bit sequence by performing a channel coding and rate matching on the to-be-fed-back UCI in accordance with a quantity of symbols carrying the UCI in the PUCCH and a quantity of the target slots, and transmitting, in each of the plurality of target slots, a PUCCH carrying a bit sub-sequence of the second coded bit sequence that corresponds to the target slot.

12. A base station, comprising: a processor, a memory connected to the processor via a bus interface, and a transceiver connected to the processor via the bus interface, wherein the memory is configured to store program and data used by the processor in operation, the transceiver is configured to transmit a control command, and the processor is configured to call and execute the program and data stored in the memory to implement following steps:
  determining a plurality of target slots to transmit to-be-fed-back uplink control information (UCI), wherein the to-be-fed-back UCI is transmitted in the target slots by using the PUCCH;
  determining a transmission duration or format of the PUCCH carrying the to-be-fed-back UCI in each of the plurality of target slots respectively; and,
  receiving, in accordance with the determined transmission duration or format of the PUCCH, the PUCCH carrying the to-be-fed-back UCI in each of the plurality of target slots,
  wherein the receiving the PUCCH carrying the to-be-fed-back UCI in each of the plurality of target slots comprises:
  when a size of the to-be-fed-back UCI is less than or equal to a first preset value, receiving a PUCCH carrying a modulation symbol in each of the plurality of target slots, wherein the modulation symbol results from a modulation performed by user equipment (UE) on the to-be-fed-back UCI; and
  when the size of the to-be-fed-back UCI is greater than the first preset value, receiving a PUCCH carrying a first bit sequence in each of the plurality of target slots; or, when the size of the to-be-fed-back UCI is greater than the first preset value, receiving, in each of the plurality of target slots, a PUCCH carrying a bit sub-sequence of the second bit sequence that corresponds to the target slot,
  wherein the first bit sequence is a coded bit sequence resulting from a channel coding and rate matching performed by the UE on the to-be-fed-back UCI in accordance with a quantity of symbols carrying the UCI in the PUCCH, and the second bit sequence is a coded bit sequence resulting from a channel coding and rate matching performed by the UE on the to-be-fed-back UCI in accordance with a quantity of symbols carrying the UCI in the PUCCH and a quantity of the target slots.

13. The UE according to claim 11, wherein the determining the plurality of target slots to transmit the to-be-fed-back UCI comprises:
  determining the plurality of target slots to transmit the to-be-fed-back UCI in accordance with predefined information of the plurality of target slots; or,
  determining the plurality of target slots to transmit the to-be-fed-back UCI in accordance with information of the plurality of target slots which is configured by a higher layer signaling; or,
  receiving information of the plurality of target slots which is transmitted by a preset physical downlink control channel (PDCCH), determining the plurality of target slots to transmit the to-be-fed-back UCI, wherein the preset PDCCH comprises at least one of: a PDCCH corresponding to a physical downlink shared channel (PDSCH) for which the UCI is fed back in the PUCCH, a PDCCH indicating a downlink semi-persistent scheduling (SPS) resource release for which the UCI is fed back in the PUCCH, or a multicast PDCCH indicating a slot format of the target slot.

14. The UE according to claim 11, wherein the determining the transmission duration or format of the PUCCH carrying the to-be-fed-back UCI in each of the plurality of target slots respectively comprises:
  receiving the transmission duration or format, which is transmitted by a preset PDCCH, of the PUCCH carrying the to-be-fed-back UCI in each of the plurality of target slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot; or,
  determining the transmission duration or format of the PUCCH carrying the to-be-fed-back UCI in each of the plurality of target slots respectively in accordance with a size of an uplink region contained in each target slot or a size of an uplink region for a PUCCH transmission contained in each target slot; or,
  receiving indication information transmitted by a preset PDCCH, wherein the indication information indicates at least one resource set of a quantity Y of resource sets for multi-slot transmission which are predefined or configured by means of a higher layer signaling in advance, each resource set comprises at least information of an uplink region for a PUCCH transmission in each of a plurality of slots; and determining the transmission duration or format of the PUCCH carrying the to-be-fed-back UCI in each of the plurality of target slots in accordance with a size of the uplink region for a PUCCH transmission in each of the plurality of slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot, and Y is an integer greater than or equal to 2.

15. The UE according to claim 11, wherein the transmitting, in accordance with the determined transmission duration or format of the PUCCH, the PUCCH carrying the to-be-fed-back UCI in each of the plurality of target slots comprises:
  determining a transmission structure of the UCI and a reference signal (RS) of the PUCCH in each of the plurality of target slots respectively in accordance with the determined transmission duration or format of the PUCCH carrying the to-be-fed-back UCI in each of the plurality of target slots; and
  transmitting, in accordance with the transmission structure of the UCI and the RS of the PUCCH in each of the plurality of target slots, the PUCCH carrying the to-be-fed-back UCI in each of the plurality of target slots respectively.

16. The UE according to claim 15, further comprising:
  receiving start position and/or end position, transmitted by a preset PDCCH, of the PUCCH in each of one or more target slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot; and/or,
  determining, in accordance with a predetermined rule, start position and/or end position of the PUCCH in each of one or more target slots.

17. The base station according to claim 12, wherein the determining the plurality of target slots to transmit the to-be-fed-back UCI comprises:
  determining the plurality of target slots to transmit the to-be-fed-back UCI in accordance with predefined information of the plurality of target slots; or transmitting information of the plurality of target slots to user equipment (UE) by means of a higher layer signaling or a preset PDCCH, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot.

18. The base station according to claim 12, wherein the determining the transmission duration or format of the PUCCH carrying the to-be-fed-back UCI in each of the plurality of target slots respectively comprises:

determining the transmission duration or format of the PUCCH carrying the to-be-fed-back UCI in each of the plurality of target slots respectively in accordance with a size of an uplink region in each of the plurality of target slots or a size of an uplink region for a PUCCH transmission in each of the plurality of target slots; or transmitting the transmission duration or format of the PUCCH in each target slot to user equipment (UE) by means of a preset PDCCH, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot; or transmitting indication information to user equipment (UE) by means of a preset PDCCH, wherein the indication information indicates at least one resource set of a quantity Y of resource sets for multi-slot transmission which are predefined or configured by means of a higher layer signaling in advance, each resource set comprises at least information of an uplink region for a PUCCH transmission in each of a plurality of slots, such that the UE determines the transmission duration or format of the PUCCH carrying the to-be-fed-back UCI in each of the plurality of target slots in accordance with a size of the uplink region for a PUCCH transmission in each of the plurality of slots, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot, and Y is an integer greater than or equal to 2.

19. The base station according to claim 12, wherein the receiving, in accordance with the determined transmission duration or format of the PUCCH, the PUCCH carrying the to-be-fed-back UCI in each of the plurality of target slots comprises:

determining a transmission structure of the UCI and a reference signal (RS) in the PUCCH in each of the plurality of target slots respectively in accordance with the transmission duration or format of the PUCCH in each of the plurality of target slots; and transmitting, in accordance with the transmission structure of the UCI and the RS of the PUCCH in each of the plurality of target slots, the PUCCH carrying the to-be-fed-back UCI in each of the plurality of target slots respectively.

20. The base station according to claim 19, further comprising:

determining, in accordance with a predetermined rule, a start position and/or an end position of the PUCCH in each of the plurality of target slots respectively;

transmitting the determined start position and/or end position of the PUCCH in each of the plurality of target slots to user equipment (UE) by means of a preset PDCCH, wherein the preset PDCCH comprises at least one of: a PDCCH corresponding to a PDSCH for which the UCI is fed back in the PUCCH, a PDCCH indicating a downlink SPS resource release for which the UCI is fed back in the PUCCH, or a multicast PDCCH indicating a slot format of the target slot.

* * * * *